(12) United States Patent
Ambur et al.

(10) Patent No.: US 12,013,559 B2
(45) Date of Patent: Jun. 18, 2024

(54) OPTICAL COMPONENTS AND OPTICAL SYSTEMS

(71) Applicant: 3M INNOVATIVE PROPERTIES COMPANY, St. Paul, MN (US)

(72) Inventors: Gregg A. Ambur, River Falls, WI (US); Jo A. Etter, Kirklad, WA (US); Adam D. Haag, Woodbury, MN (US); Carl A. Stover, St. Paul, MN (US); Timothy J. Nevitt, Red Wing, MN (US); Zhisheng Yun, Sammamish, WA (US); Timothy L. Wong, St. Paul, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 411 days.

(21) Appl. No.: 16/650,519

(22) PCT Filed: Sep. 28, 2018

(86) PCT No.: PCT/IB2018/057570
§ 371 (c)(1),
(2) Date: Mar. 25, 2020

(87) PCT Pub. No.: WO2019/073330
PCT Pub. Date: Apr. 18, 2019

(65) Prior Publication Data
US 2020/0319388 A1    Oct. 8, 2020

Related U.S. Application Data

(60) Provisional application No. 62/577,203, filed on Oct. 26, 2017, provisional application No. 62/569,942, filed on Oct. 9, 2017.

(51) Int. Cl.
*G02B 5/30* (2006.01)
*G02B 27/28* (2006.01)

(52) U.S. Cl.
CPC .......... *G02B 5/305* (2013.01); *G02B 27/283* (2013.01)

(58) Field of Classification Search
CPC ........ G02B 5/305; G02B 5/30; G02B 5/3025; G02B 5/3033; G02B 5/3041;
(Continued)

(56) References Cited

U.S. PATENT DOCUMENTS 5,882,774 A    3/1999    Jonza
6,025,897 A    2/2000    Weber
(Continued)

FOREIGN PATENT DOCUMENTS

EP    3121627    1/2017
JP    2013200452 A    10/2013
(Continued)

OTHER PUBLICATIONS

Anonymous, Polymeric Interference Filters combined with Optical Elements, IP.com Prior Art Database Technical Disclosure, Apr. 24, 2003 (Year: 2003).*
(Continued)

*Primary Examiner* — Stephone B Allen
*Assistant Examiner* — Adam W Booher
(74) *Attorney, Agent, or Firm* — Clifton F. Richardson

(57) ABSTRACT

An optical system including a first optical element having a curved first major surface and an optical stack bonded and conforming to the curved first major surface of the first optical element is described. The optical stack includes a reflective polarizer substantially transmitting light having a first polarization state and substantially reflecting light having an orthogonal second polarization state and a non-adhesive flexible optical layer bonded to the reflective polarizer and comprising substantially parallel opposing first and second major surfaces. At least one location on the
(Continued)

non-adhesive flexible optical layer has an optical retardance of less than about 100 nm or greater than about 200 nm at a wavelength of about 550 nm.

18 Claims, 23 Drawing Sheets

(58) Field of Classification Search
CPC .. G02B 5/3008; G02B 5/3016; G02B 5/3083; G02B 27/28; G02B 27/283
See application file for complete search history.

(56) References Cited

U.S. PATENT DOCUMENTS

| | | | |
|---|---|---|---|
| 6,075,651 A | 6/2000 | Hoppe | |
| 6,096,375 A | 8/2000 | Ouderkirk | |
| 6,609,795 B2 | 8/2003 | Weber | |
| 6,916,440 B2 | 7/2005 | Jackson | |
| 6,991,695 B2 | 1/2006 | Tait | |
| 7,826,009 B2 | 11/2010 | Weber | |
| 8,817,371 B1 | 8/2014 | Boothroyo | |
| 9,581,827 B1 | 2/2017 | Wong | |
| 10,520,734 B1 * | 12/2019 | Chan | G02B 17/0856 |
| 2002/0031676 A1 | 3/2002 | Jonza | |
| 2002/0180916 A1 | 12/2002 | Schadt | |
| 2003/0028048 A1 | 2/2003 | Cherkaoui | |
| 2005/0072959 A1 | 4/2005 | Moia | |
| 2005/0243425 A1 | 11/2005 | Wheatley | |
| 2009/0185112 A1 | 7/2009 | Kawabe | |
| 2010/0254002 A1 | 10/2010 | Merrill | |
| 2012/0206806 A1 | 8/2012 | Weber | |
| 2015/0205035 A1 | 7/2015 | Border | |
| 2016/0202556 A1 | 7/2016 | Lee | |
| 2016/0306086 A1 | 10/2016 | Haag | |
| 2016/0313555 A1 * | 10/2016 | Liou | G02B 27/0101 |
| 2016/0334604 A1 | 11/2016 | Huddleston | |
| 2017/0017077 A1 | 1/2017 | Tang et al. | |
| 2017/0068029 A1 | 3/2017 | Yun | |
| 2017/0068100 A1 | 3/2017 | Ouderkirk | |
| 2019/0025590 A1 * | 1/2019 | Haddick | G02B 27/14 |
| 2019/0064549 A1 * | 2/2019 | Brown | G02C 7/02 |
| 2019/0079304 A1 * | 3/2019 | Ando | G02B 27/144 |

FOREIGN PATENT DOCUMENTS

| | | | |
|---|---|---|---|
| JP | 2015-205410 | 11/2015 | |
| WO | 1999036258 A1 | 7/1999 | |
| WO | WO-9936258 A1 * | 7/1999 | B29C 48/08 |
| WO | 01268911 W | 4/2001 | |
| WO | 2004104657 A1 | 12/2004 | |
| WO | 20041046571 W | 12/2004 | |
| WO | WO-2015085114 A1 * | 6/2015 | F21V 9/14 |
| WO | WO 2017-058562 | 4/2017 | |
| WO | WO 2018-163009 | 9/2018 | |

OTHER PUBLICATIONS

International Search Report for PCT International Application No. PCT/IB2018/057570, dated Apr. 9, 2019, 6 pages.

* cited by examiner

OPTICAL COMPONENTS AND OPTICAL SYSTEMS

BACKGROUND

Reflective polarizers are used in a variety of optical systems. Some optical systems utilize a reflective polarizer disposed on a surface of a lens. Other optical systems include a polarizing beam splitter which includes a reflective polarizer disposed between two prisms.

SUMMARY

In some aspects of the present description, an optical system including a first optical element comprising a curved first major surface and an optical stack bonded and conforming to the curved first major surface of the first optical element is provided. The optical stack includes a reflective polarizer substantially transmitting light having a first polarization state and substantially reflecting light having an orthogonal second polarization state, and a non-adhesive flexible optical layer bonded to the reflective polarizer and comprising substantially parallel opposing first and second major surfaces. At least one location on the non-adhesive flexible optical layer has an optical retardance of less than about 100 nm or greater than about 200 nm at a wavelength of about 550 nm.

In some aspects of the present description, a polarizing beam splitter (PBS) including a first prism comprising a first hypotenuse, a second prism comprising a second hypotenuse facing the first hypotenuse, and an optical stack disposed between and adhered to the first and second hypotenuses is provided. The optical stack includes a reflective polarizer substantially transmitting light having a first polarization state and substantially reflecting light having an orthogonal second polarization state, a non-adhesive flexible optical layer bonded to the reflective polarizer and comprising substantially parallel opposing first and second major surfaces, and an adhesive layer disposed between and bonding the reflective polarizer to the non-adhesive flexible optical layer. At least one location on the non-adhesive flexible optical layer has an optical retardance less than about 100 nm or greater than about 200 nm.

In some aspects of the present description, a lens assembly including a first optical lens having an optical power in at least one direction and an optical stack adhered to the first optical lens is provided. The optical stack includes a reflective polarizer substantially transmitting light having a first polarization state and substantially reflecting light having an orthogonal second polarization state, a non-adhesive flexible optical layer bonded to the reflective polarizer and comprising substantially parallel opposing first and second major surfaces, and an adhesive layer disposed between and bonding the reflective polarizer to the non-adhesive flexible optical layer. At least one location on the non-adhesive flexible optical layer has an optical retardance less than about 100 nm or greater than about 200 nm.

In some aspects of the present description, a lens assembly including a first optical lens comprising an optical power in at least one direction and a curved first major surface an integrally formed reflective polarizer adhered to the first major surface of the first optical lens is provided. The integrally formed reflective polarizer includes a plurality of interference layers, each interference layer reflecting or transmitting light primarily by optical interference. At least one interference layer is substantially uniaxially oriented at at least one location. The reflective polarizer substantially transmits light having a first polarization state and substantially reflects light having an orthogonal second polarization state. The first major surface comprises an active region having a maximum projected dimension D and a corresponding maximum sag S, where $S/D \geq 0.03$. An average thickness of the reflective polarizer is greater than about 50 micrometers.

In some aspects of the present description, an optical film including a plurality of interference layers and at least one noninterference layer is provided. Each interference layer reflects or transmits light primarily by optical interference. The at least one noninterference layer is integrally formed with the plurality of interference layers and does not reflect or transmit light primarily by optical interference. An average total thickness of the plurality of interference layers is from about 20 micrometers to about 70 micrometers. An average total thickness of the at least one noninterference layer is from about 40 micrometers to about 100 micrometers. For substantially normally incident light in a predetermined wavelength range, the plurality of interference layers has an average optical transmittance greater than about 85% for a first polarization state, and an average optical reflectance greater than about 80% for an orthogonal second polarization state.

In some aspects of the present description, a reflective polarizer assembly including an integrally formed reflective polarizer and an optical element formed directly on and conforming to the outermost curved major surface of the reflective polarizer is provided.

The integrally formed reflective polarizer has an average thickness of greater than about 50 micrometers and includes a plurality of interference layers, each interference layer reflecting or transmitting light primarily by optical interference. At least one interference layer being substantially uniaxially oriented at at least one location. The integrally formed reflective polarizer has an outermost curved major surface.

In some aspects of the present description, a lens assembly including a first optical lens having an optical power in at least one direction and a curved major first surface having an undesired characteristic, an integrally formed reflective polarizer having opposing major first and second outermost surfaces, and an adhesive layer bonding the major first surface of the integrally formed reflective polarizer to the major first surface of the first optical lens is provided. The integrally formed reflective polarizer includes a plurality of interference layers, each interference layer reflecting or transmitting light primarily by optical interference. The bonding compensates for the undesired uncharacteristic of the first major surface of the first optical lens. The second outermost surface of the integrally formed reflective polarizer has a desired characteristic.

In some aspects of the present description, an optical system including at least one lens having an optical power greater than zero in at least one direction, a partial reflector having an average optical reflectance of at least 30% for substantially normally incident light in a predetermined wavelength range, and a reflective polarizer substantially transmitting light having a first polarization state in the predetermined wavelength range and substantially reflecting light having an orthogonal second polarization state in the predetermined wavelength range is provided. The optical system has an optical axis. A light ray propagating along the optical axis passes through the at least one lens, the partial reflector and the reflective polarizer without being substantially refracted. For an incident cone of light having the second polarization state and a wavelength in the predetermined wavelength range and centered on the optical axis with a full cone angle from about 100 degrees to about 160 degrees, the incident light exits the optical system having a first light component having the first polarization state and a second light component having the second polarization state. A ratio of an average intensity of the first light component to an average intensity of the second light component is greater than about 100.

DETAILED DESCRIPTION

Figure 1:
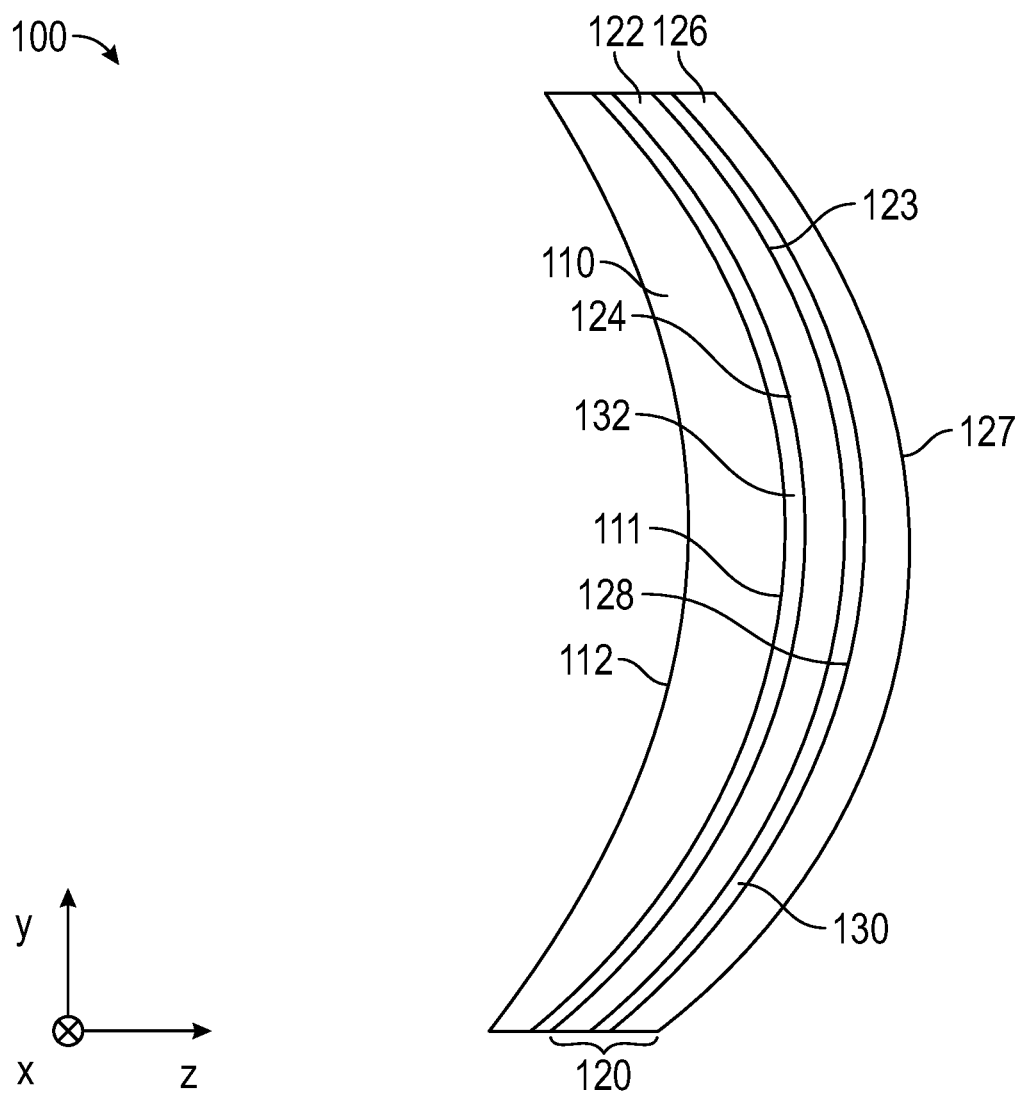
FIG. 1 is a schematic cross-sectional view of an optical component.

In the following description, reference is made to the accompanying drawings that form a part hereof and in which various embodiments are shown by way of illustration. The drawings are not necessarily to scale. It is to be understood that other embodiments are contemplated and may be made without departing from the scope or spirit of the present description. The following detailed description, therefore, is not to be taken in a limiting sense.

Optical components of the present description include optical films such as reflective polarizer films, reflective polarizer assemblies, lens assemblies, and polarizing beam splitters (PBSs). Optical systems of the present description include optical systems incorporating an optical component of the present description. In some cases, the optical systems utilize a folded optics design. According to some embodiments of the present description, it has been found that including a non-adhesive flexible optical layer with a reflective polarizer in an optical stack and/or using a thick multilayer optical film reflective polarizer, can allow the reflective polarizer to be curved to a higher sag to diameter ratio, for example, and maintain suitable performance without defects appearing in the forming process. For example, it has been found that optical systems utilizing a folded optics design incorporating an optical stack or reflective polarizer of the present description and a partial reflector can achieve a higher polarization contrast compared to using conventional optical stacks or reflective polarizers as described further elsewhere herein. As another example, it has been found the optical systems utilizing a polarizing beam splitter (PBS) incorporating an optical stack or reflective polarizer of the present description provides improved contrast compared to optical systems using a conventional PBS and improved ability to manufacture the PBS without defects.

While reflective polarizer films which are not substantially uniaxially oriented (e.g., Dual Brightness Enhancement Films (DBEF) available from 3M Company (St. Paul, MN)) can have a total thickness greater than 100 micrometers, substantially uniaxially oriented films (e.g., Advanced Polarizing Films (APF) available from 3M Company) are typically much thinner. For example, APF films are typically less than about 35 micrometers thick. According the present description, it has been found that thick (e.g., greater than about 50 micrometers thick) substantially uniaxially oriented reflective polarizer films provide improved properties when formed into a curved shape, for example, and used in an optical system as described further elsewhere herein. The improved properties include improved mechanical properties and improved optical properties. The improved mechanical properties include improved formability to a higher curvature or to a higher sag to diameter ratio without creating defects (e.g., wrinkles from buckling) in the film. The improved optical properties include improved polarization contrast when used in an optical system utilizing a folded optics design as described further elsewhere herein. In some cases, the improvement in optical properties results from better preserving desired optical properties of the reflective polarizer film when the thicker film or optical stack is formed into a curved shape. Alternatively, or in addition, improvement in optical properties can result from starting with (before forming) improved reflective polarizer films. For example, reflective polarizer films having a reduced block state transmission can be provided by incorporating dichroic dyes in some interference layers and/or including additional interference layers as described further elsewhere herein.

In addition to or instead of using a thick reflective polarizer film, bonding a non-adhesive flexible optical film to the reflective polarizer prior to forming has been found to improve the physical properties. The thickness of a reflective polarizer can be increased by including additional interference layers in a given thickness range (e.g., by using two-packets of interference layers having the same, or about the same, thickness range) and/or by increasing the thickness of noninterference layers.

In some embodiments, the reflective polarizer includes two or more packets of alternating polymeric interference layers to provide a high contrast. Such reflective polarizers are described further in U.S. Prov. Pat. Appl. No. 62/467,712 (Haag et al.), filed Mar. 6, 2017 and hereby incorporated herein by reference to the extent that it does not contradict the present description. The term "packet" is used to refer to a continuous set of alternating interference layers that is absent of any spacer or non-interference layers formed within the packet (e.g., sequentially arranged). In some examples, spacer, non-interference layers, or other layers may be added to the outside of a given stack/packet, thereby forming the outer layers of the film without disrupting the alternating pattern of interference layers in the packet. In some embodiments, the thickness distribution of the interference layer in the two different packets substantially overlap (e.g., both cover a same predetermined wavelength range) in order to increase the contrast ratio of the reflective polarizer. In some embodiments, the reflective polarizer has a contrast ratio (the transmittance of normally incident light in the pass polarization state divided by the transmittance of normally incident light in the block polarization state) of at least 100, or at least 200, or at least 500, or at least 1000, or at least 2000. In comparison, conventional multilayer optical film reflective polarizers often have a contrast ratio of about 50 or less.

FIG. 1 is a schematic cross-sectional view of an optical component 100 including a first optical element 110 having a curved first major surface 111 and an opposing second major surface 112; and an optical stack 120 bonded and conforming to the curved first major surface 111 of the first optical element 110. In some embodiments, the optical stack 120 is bonded to the optical element 110 through an optional adhesive layer 132. In some embodiments, the optical stack 120 is bonded to the optical element 110 by virtue of the optical element 110 being integrally formed on the optical stack 120 by an insert molding process, for example, and optional adhesive layer 132 is omitted. The optical stack 120 includes first and second layers 122 and 126. The first layer 122 has opposing first and second major surfaces 123 and 124, and the second layer 126 has opposing first and second major surfaces 127 and 128. In some embodiments, the first and second layers 122 and 126 are bonded to each other through an optional adhesive layer 130. In some embodiments, the first and second layers 122 and 126 are bonded to each other by virtue of being integrally formed with each other and optional adhesive layer 130 is omitted.

As used herein, a first element "integrally formed" with a second element means that the first and second elements are manufactured together rather than manufactured separately and then subsequently joined. Integrally formed includes manufacturing a first element followed by manufacturing the second element on the first element. A reflective polarizer including a plurality of layers is integrally formed if the layers are manufactured together (e.g., combined as melt streams and then cast onto a chill roll to form a cast film having each of the layers, and then orienting the cast film) rather than manufactured separately and then subsequently joined.

Any of the adhesive layers used herein may have an average thickness from about 1 micrometer to about 50 micrometers. The adhesive layer may be or include one or more of a pressure sensitive adhesive, a hot melt adhesive, a thermoset adhesive, a solvent based adhesive, and a water based adhesive, for example. In some embodiments, the adhesive layer is substantially index matched to an immediately adjacent layer as described further elsewhere herein. In some embodiments, the adhesive layer is an optically clear adhesive layer. Suitable optically clear adhesives include those available from 3M Company (e.g., 3M Optically Clear Adhesive 8171 and 8172, which are 1 mil and 2 mil thick, respectively) and Norland Optical Adhesives available from Norland Products Inc. (Cranbury, NJ), for example.

In some embodiments, first layer 122 is a reflective polarizer substantially transmitting light having a first polarization state and substantially reflecting light having an orthogonal second polarization state; and second layer 126 is a non-adhesive flexible optical layer bonded to the reflective polarizer and having substantially parallel opposing first and second major surfaces 127 and 128. In some embodiments, second layer 126 is a reflective polarizer substantially transmitting light having a first polarization state and substantially reflecting light having an orthogonal second polarization state; and first layer 122 is a non-adhesive flexible optical layer bonded to the reflective polarizer and having substantially parallel opposing first and second major surfaces 123 and 124.

In some embodiments, the second layer 126 is a liner releasably bonded to the first layer 122. Release liners may be applied to an optical film prior to forming the optical film into a curved shape to protect the optical film. One of the release liners may be removed prior to molding a lens or other optical element onto the optical film and the other release liner may be retained to protect the optical film (e.g., so that the mold does not scratch or impart a surface texture from the mold onto the optical film). A liner that is bonded to an optical film but that can be cleanly removed from the optical film without substantially damaging the optical film may be described as releasably bonded to the optical film and may be described as a release liner. In some embodiments, a liner that is releasably bonded to an optical film can be removed from the optical film with no visible damage to the optical film. A releasably bonded liner may include a substrate with an adhesive layer that bonds strongly to the substrate but weakly to the optical film. For example, a liner may include a thin layer of low tack adhesive applied to a substrate with a surface treated to increase its bond to the adhesive. Other suitable liners include those that electrostatically bond to the optical film as described in U.S. Pat. No. 6,991,695 (Tait et al.), for example. One example of a suitable liner is OCPET NSA33T available from Sun A Kaken Co, Ltd.

The first and second major surfaces of a non-adhesive flexible optical layer may be described as substantially parallel if the major surfaces are sufficiently close to parallel that the non-adhesive flexible optical layer has negligible refractive optical power or if the slopes at each of pair of opposing points over at least 80% of the first and second major surfaces differ by no more than 30 degrees. In some embodiments, the slopes of each pair of opposing points over at least 80%, or at least 85%, or at least 90% of the first and second major surfaces differ by no more than 20 degrees, or by no more than 10 degrees, or no more than 5 degrees. The opposing points refer to points along a line along the thickness direction of the non-adhesive flexible optical layer where the line is normal to at least one of the first and second major surfaces. In some embodiments, the non-adhesive flexible optical layer had parallel major surfaces before being formed into a desired shape, but surfaces which may not be exactly parallel after forming due to a thickness variation in the layer resulting from forming.

A reflective polarizer substantially reflects light having one of orthogonal first and second polarization states (e.g., a first polarization state with the electric field along the x-axis) and substantially transmits light having the other of the first and second polarization states (e.g., a second polarization state with the electric field along the y-axis) in a predetermined wavelength range. A reflective polarizer may be said to substantially transmit light having a first polarization state in a predetermined wavelength range if at least 60 percent of light having the first polarization state in the predetermined wavelength range and normally incident on the reflective polarizer from a side of the reflective polarizer is transmitted through the reflective polarizer. In some embodiments, at least 70 percent, or at least 80 percent, or at least 85% of light having the first polarization state in the predetermined wavelength range is transmitted through the polarizer. A reflective polarizer may be said to substantially reflect light having a second polarization state in a predetermined wavelength range if at least 60 percent of light having the second polarization state in the predetermined wavelength and normally incident on the reflective polarizer from a side of the reflective polarizer is reflected from the reflective polarizer. In some embodiments, at least 70 percent, or at least 80 percent, or at least 85 percent of light having the second polarization state and the predetermined wavelength is reflected from the polarizer. In some embodiments, as described further elsewhere herein, a reflective polarizer may include layers which partially absorb light having the second polarization state.

The predetermined wavelength range may be the wavelength range over which the optical system is designed to operate. For example, the predetermined wavelength range may be the visible range (400 nm to 700 nm). As another example, the predetermined wavelength range may include one or more visible wavelength ranges. For example, the predetermined wavelength range may be the union of more than one narrow wavelength ranges (e.g., the union of disjoint red, green and blue wavelength ranges corresponding to light emission colors of a display panel). Such wavelength ranges are described further in U.S. Pat. Appl. Pub. No. 2017/0068100 (Ouderkirk et al.), which is hereby incorporated herein by reference to the extent that it does not contradict the present description. In some embodiments, the predetermined wavelength ranges include other wavelength ranges (e.g., infrared (e.g., near infrared (about 700 nm to about 2500 nm)), or ultraviolet (e.g., near ultraviolet (about 300 nm to about 400 nm)) as well as visible wavelength ranges.

The reflective polarizer used in the optical systems of the present description may be any suitable type of reflective polarizer. The reflective polarizer may be a polymeric multilayer optical film such as those described in U.S. Pat. No. 5,882,774 (Jonza et al.), and U.S. Pat. No. 6,609,795 (Weber et al.), for example. The reflective polarizer may be substantially uniaxially oriented. A reflective polarizer or a layer in a reflective polarizer is substantially uniaxially oriented if it is substantially oriented in one in-plane direction and not substantially oriented in the orthogonal in-plane direction and not substantially oriented in the thickness direction. Substantially uniaxially oriented reflective polarizers are available from 3M Company under the trade designation Advanced Polarizing Film or APF. Other types of multilayer optical film reflective polarizers (e.g., Dual Brightness Enhancement Film or DBEF available from 3M Company) may also be used. DBEF films are oriented substantially more in one in-plane direction than in the orthogonal in-plane direction and also exhibit orientation in the thickness direction. DBEF films are not substantially uniaxially oriented as "substantially uniaxially oriented" is used herein.

In some embodiments, the reflective polarizer prior to forming into a curved shape is substantially uniaxially oriented in that it has a degree of uniaxial character U of at least 0.7, or at least 0.8, or at least 0.85, where $U=(1/MDDR-1)/(TDDR^{1/2}-1)$ with MDDR defined as the machine direction draw ratio and TDDR defined as the transverse direction draw ratio. Such substantially uniaxially oriented multilayer optical films are described in U.S. Pat. No. 2010/0254002 (Merrill et al.), which is hereby incorporated herein to the extent that it does not contradict the present description and may include a plurality of alternating first and second polymeric layers with the first polymeric layers having indices of refraction in a length direction (e.g., x-direction) and a thickness direction (e.g., z-direction) that are substantially the same, but substantially different from an index of refraction in a width direction (e.g., y-direction). For example, the absolute value of the difference in the refractive indices in the x- and z-directions may be less than 0.02 or less than 0.01, and the absolute value of the difference in the refractive indices in the x- and y-directions may be greater than 0.05, or greater than 0.10. Except where specified differently, refractive index refers to the refractive index at a wavelength of 550 nm. After forming into a curved shape, a reflective polarizer may have at least one layer that it substantially uniaxially oriented at at least one location. In some embodiments, the at least one layer at the at least one location has a first refractive index in a first direction along the thickness of the layer, a second refractive index in a second direction orthogonal to the first direction, and a third refractive index in a third direction orthogonal to the first and second directions, an absolute value of a difference in the first and third refractive indices being less than about 0.02, or less than about 0.01, and an absolute value of a difference in the second and third refractive indices being greater than about 0.05, or greater than about 0.10. In some embodiments, after being formed into a curved shape, a reflective polarizer has at least one layer that it substantially uniaxially oriented at a plurality of locations.

According the present description, it has been found that substantially uniaxially oriented reflective polarizer films which are substantially thicker than conventional substantially uniaxially oriented reflective polarizer films provide improved properties when formed into a curved shape and used in an optical system as described further elsewhere herein. In some embodiments, an average thickness of the reflective polarizer is greater than about 50 micrometers, or greater than about 60 micrometers, or greater than about 70 micrometers.

Materials suitable for the higher refractive index interference layers in a reflective polarizer or mirror film include, for example, polyethylene naphthalate (PEN), copolymers containing PEN and polyesters (e.g., polyethylene terephthalate (PET) or dibenzoic acid), glycol modified polyethylene terephthalate. Materials suitable for the lower refractive index interference layers in a reflective polarizer or mirror film include, for example, copolyesters based on PEN, copolyesters based on PET, polycarbonate (PC), or blends of these three classes of materials. To achieve high reflectivities with a desired number of layers, adjacent microlayers can exhibit a difference in refractive indices for light polarized along a block axis of at least 0.2, for example.

A non-adhesive flexible optical layer is an optical layer which is not an adhesive that bonds adjacent layers together and that is flexible. In some cases, it is convenient to characterize the flexibility of the layer in terms of the flexural rigidity of the layer which is given by $D=(1/12)Et^3/(1-\mu^2)$ where t is the layer thickness, E is the Young's modulus, and µ is the Poisson ratio. In some embodiments, the non-adhesive flexible optical layer has a flexural rigidity of less than 100 N-m, or less than 50 N-m, or less than 20 N-m, or less than 10 N-m, or less than 5 N-m, or less than 3 N-m, or less than 1 N-m, or less than 0.5 N-m.

The non-adhesive flexible optical layer can be or include one or more of a polymeric film, an anti-reflective coating, an absorbing polarizer, a neutral-density filter, a retarder, a dyed film, an optical filter, a film containing electrical circuits, electrodes, infrared reflecting film, a multilayer optical film, and a diffuser, for example. In some embodiments, the non-adhesive flexible optical layer is an optically clear film substrate such as polyethylene terephthalate (PET), polyethylene naphthalate (PEN), or polymethylmethacrylate (PMMA). A film or adhesive layer may be described as optically clear if it has a transmittance of unpolarized normally incident light in a predetermined wavelength range (e.g., 400 nm to 700 nm) of at least 80 percent and has a haze of less than 20 percent. In some embodiments, the non-adhesive flexible optical layer is an optically clear film having a transmittance of unpolarized normally incident light in a wavelength range of 400 nm to 700 nm of at least 85 percent and has a haze of less than 10 percent, or less than 5 percent. In some embodiments, the non-adhesive flexible optical layer is a dyed film and/or an optical filter and is used to adjust some aspect (e.g., color or intensity) of transmitted light. For example, a neutral-density filter can be included to reduce intensity of all visible light transmitted through the filter. Electrical circuits can be used to control display elements or touch sensitive elements, for example. Electrodes may be included for darkening liquid crystal display elements, for example. In some embodiments, the non-adhesive flexible optical layer is a release liner as described further elsewhere herein. In some embodiments, the release liner comprises a PET substrate, for example.

In some embodiments, the first optical element 110 is rigid. For example, the first optical element 110 may be made of a glass material or a polymeric material at a sufficient thickness that the first optical element 110 does not appreciably flex under the application of a 0.5 lb (2.2 Newton) force. In some embodiments, the first optical element 110 is less flexible than the non-adhesive flexible optical layer (one of first and second layers 122 and 126). For example, the first optical element 110 may be rigid, while the non-adhesive flexible optical layer may be a flexible film (e.g., a film which appreciably flexes or folds under the application of a 0.5 lb force).

Optical component 100 may be used as a component in an optical system or may be considered to be an optical system itself. In some embodiments, optical element 110 is an optical lens and optical component 100 is a lens assembly. In some embodiments, the optical lens has optical power in at least one direction. For example, the optical lens may be a cylindrical lens having optical power in the y-direction, referring to the x-y-z coordinate system of FIG. 1. As another example, the optical lens may be curved in two mutually orthogonal direction (e.g., x- and y-directions) and may have optical power in two mutually orthogonal directions (e.g., x- and y-directions). In some embodiments, the optical lens has a substantially planar surface (e.g., second major surface 112 may be planar). A surface is substantially planar if each point over at least 80 percent of the surface has a radius of curvature at least 5 times a largest lateral dimension of the surface. In some embodiments, a substantially planar surface has a radius of curvature at each point over at least 80 percent, or at least 90 percent, or at least 95 percent of the curve that is at least 5 times, or at least 10 times, or at least 20 times, or at least 50 times a largest lateral dimension of the surface.

Figure 2:
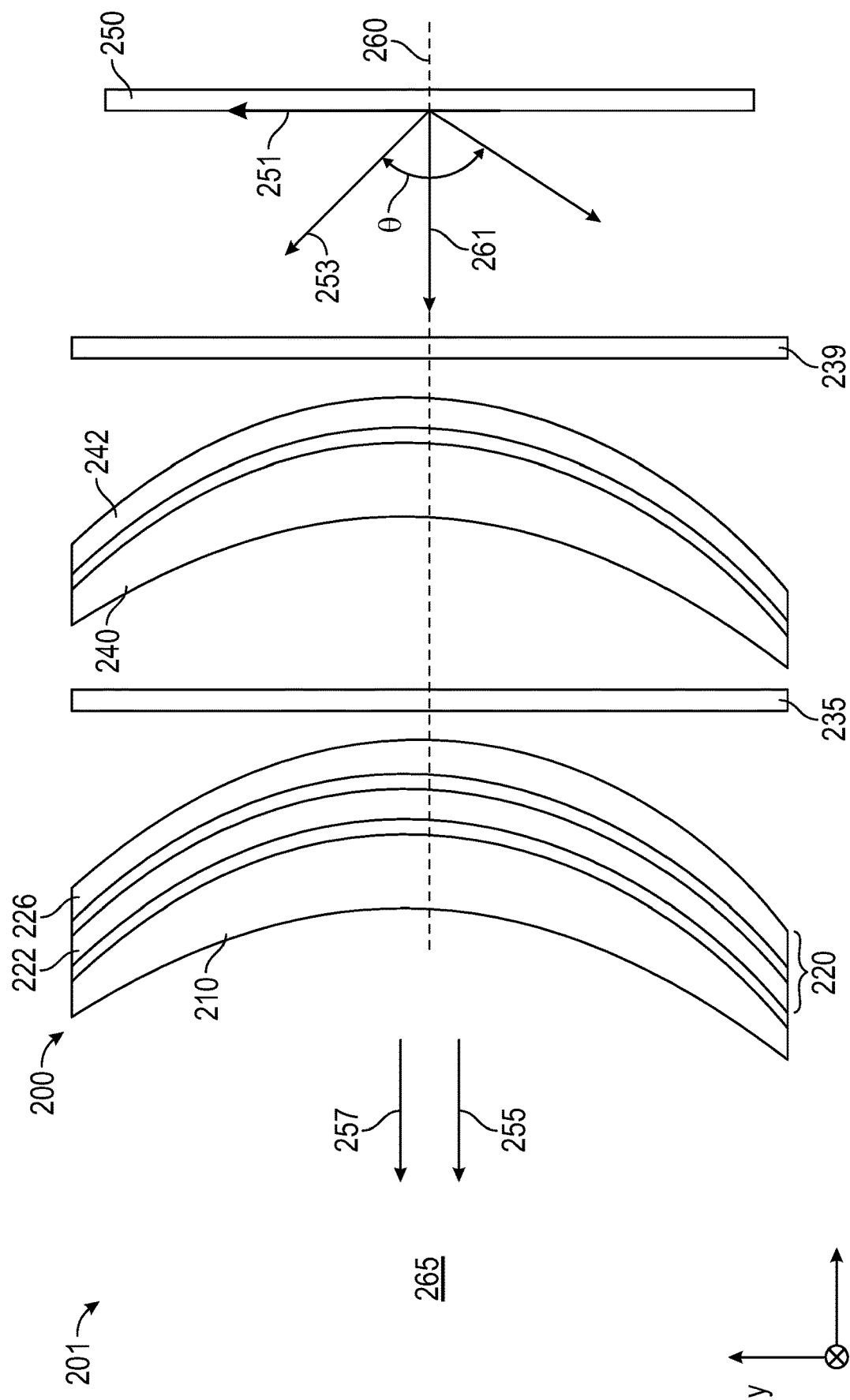
FIG. 2 is a schematic cross-sectional view of an optical system.

FIG. 2 is a schematic cross-sectional view of an optical system 201 which includes a lens assembly 200. Lens assembly 200 may correspond to optical component 100 and includes a first lens 210 and an optical stack 220 disposed on and conforming to a curved major surface of the first lens 210. The optical stack 220 includes first layer 222 and second layer 226. Optional adhesive layers may be disposed between the first and second layers 222 and 226 and/or between the optical stack 220 and the first lens 210. In some embodiments, one of the first and second layers 222 and 226 is a reflective polarizer and the other of the first and second layers 222 and 226 is a non-adhesive flexible optical layer. Optical system 201 further includes a retarder 235, a retarder 239, and a second lens 240 having a partial reflector 242 disposed on a major surface of the second lens 240. In some embodiments, the optical system 201 is adapted for displaying an image 251 emitted by a display 250 to a viewing position 265.

In some embodiments, the first lens 210 and the first optical stack 220 are spaced apart from the second lens 240. In some embodiments, first lens 210 is a first optical element having substantially non-parallel first and second major surfaces, and second lens 240 is a second optical element having substantially non-parallel first and second major surfaces. The first and second major surfaces of a lens may be described as substantially non-parallel if the major surfaces are sufficiently different that the lens has non-negligible refractive optical power or if the slopes at at least one pair of opposing points on the first and second major surfaces differ by at least 10 degrees. In some embodiments, the slopes at at least one pair of opposing points on the first and second major surfaces differ by at least 20 degrees or at least 30 degrees. The opposing points refer to points along a line along the thickness direction of the lens where the line is normal to one of the first and second major surfaces. First and second major surfaces of a prism may be described as substantially non-parallel if an angle between the surfaces is at least about 20 degrees. In some embodiments, an angle between substantially non-parallel first and second major surfaces of a prism is at least about 30 degrees.

Other configurations of the optical system 201 are possible. In some embodiments, the retarder 235 can be disposed on the optical stack 220 opposite the first lens 210 or can be disposed on the second lens 240 opposite the partial reflector 242. In some embodiments, the retarder 239 can be disposed on the partial reflector 242 or can be disposed on the display 250. In some embodiments, the first and second lens 210 and 240 are replaced with a single lens (e.g., with the partial reflector 242 on one major surface and the optical stack 220 on the opposing major surface). In still other embodiments, more than two lenses are included. Other possible arrangements for an optical system are described in U.S. Pat. Appl. Pub. No. 2017/0068100 (Ouderkirk et al.). The optical stack 220 can be used in place of the reflective polarizer in any of the embodiments described in U.S. Pat. Appl. Pub. No. 2017/0068100 (Ouderkirk et al.).

In some embodiments, the display 250 emits light in the block polarization state of the reflective polarizer, and the retarders 235 and 239 are disposed such that the light emitted by the display is first incident on the reflective polarizer in the block polarization state. For example, the retarders 235 and 239 may have a fast axis oriented at about 90 degrees relative to each other. The retarders 235 and 239 may each be quarter-wave retarders at at least one wavelength in the predetermined wavelength range. Other configurations are also possible. For example, the retarders 235 and 239 may be quarter wave retarders with their respective fast axes aligned. In this case, the display 250 may emit light in the pass polarization state of the reflective polarizer such that the light is first incident on the reflective polarizer in the block state.

The retarder 235 and/or 239 may be a coating on a substrate or a lens or may be a retarder film and may be formed from any suitable material including, for example, linear photopolymerizable polymer (LPP) materials and the liquid crystal polymer (LCP) materials described in US Pat. App. Pub. Nos. US 2002/0180916 (Schadt et al.), US 2003/028048 (Cherkaoui et al.) and US 2005/0072959 (Moia et al.). Suitable LPP materials include ROP-131 EXP 306 LPP and suitable LCP materials include ROF-5185 EXP 410 LCP, both available from Rolic Technologies, Allschwil, Switzerland. In some embodiments, the retarder 235 is a quarter-wave retarder at at least one wavelength in a predetermined wavelength range (e.g., 400 nm to 700 nm).

The partial reflector 242 may be any suitable partial reflector and may have an average optical reflectance in a predetermined wavelength range of at least 20% or at least 30%, for example. For example, the partial reflector may be constructed by coating a thin layer of a metal (e.g., silver or aluminum) on a transparent substrate (e.g., a film which may then be adhered to a lens, or the substrate may be a lens). The partial reflector may also be formed by depositing thin-film dielectric coatings onto a surface of a lens substrate, or by depositing a combination of metallic and dielectric coatings on the surface, for example. In some embodiments, the partial reflector has an average optical reflectance and an average optical transmittance at a predetermined wavelength or in a predetermined wavelength range that are each in a range of 20% to 80%, or each in a range of 30% to 70%, or each in a range of 40% to 60%, or each in a range of 45% to 55%. The partial reflector may be a half mirror, for example. The average optical reflectance and average optical transmittance in a predetermined wavelength range refer to the unweighted average over the predetermined wavelength range and over polarizations of the optical reflectance and optical transmittance, respectively, determined at normal incidence unless indicated otherwise. In some embodiments, the partial reflector may be a reflective polarizer or may have a polarization dependent reflectivity. However, it is typically preferred that the normal incidence optical reflectance and optical transmittance are independent or substantially independent of polarization state of the incident light. Such polarization independence can be obtained using substantially isotropic metallic layers and/or dielectric layers, for example.

In some embodiments, it is preferred that the non-adhesive flexible optical layer either have a low retardance or a high retardance. In embodiments where the non-adhesive flexible optical layer (e.g., layer 226) is disposed between the reflective polarizer (e.g., layer 222) and the partial reflector 242, it is typically preferred that the non-adhesive flexible optical layer has a low retardance. In some embodiments, at least one location of the non-adhesive flexible optical layer has an optical retardance of less than about 100 nm, or less than about 80 nm, or less than about 60 nm, or less than about 40 nm, or less than about 30 nm, or less than about 20 nm, or less than about 10 nm, or less than about 5 nm. In embodiments where the non-adhesive flexible optical layer (e.g., layer 222) is disposed outside a region between the reflective polarizer (e.g., layer 226) and a partial reflector 242, it may be preferred that the non-adhesive flexible optical layer has a high retardance. For example, a polyethylene terephthalate (PET) layer may have a high retardance depending on the thickness and degree of orientation (e.g., uniaxial or biaxial) of the layer. In some embodiments, at least one location of the non-adhesive flexible optical layer has an optical retardance of greater than about 200 nm, or greater than about 400 nm, or greater than about 800 nm, or greater than about 1000 nm, or greater than about 2000 nm, or greater than about 3000 nm, or greater than about 4000 nm.

The optical retardance at a location of a layer is the phase retardance of light transmitted through the layer that is normally incident on the layer at the location. The phase retardance is the maximum difference in phase for two orthogonally polarized light rays. The wavelength of the incident light ray is about 550 nm unless specified differently. The retardance may vary with location due to ordinary manufacturing variations, for example. In some embodiments, each location of the non-adhesive flexible optical layer has an optical retardance in any of the ranges described elsewhere herein.

In some embodiments, each of the first and second lenses 210 and 240 has an optical power greater than zero in a least one direction. In some embodiments, the partial reflector 242 has an average optical reflectance of at least 30% for substantially normally incident light in a predetermined wavelength range. In some embodiments, the reflective polarizer (one of first and second layers 222 and 226) substantially transmits light having a first polarization state in the predetermined wavelength range and substantially reflects light having an orthogonal second polarization state in the predetermined wavelength range. The optical system 201 has an optical axis 260, which can be understood to be an axis along which a light ray 261 propagating along the optical axis 260 passes through the first lens 210, the second lens 240, the partial reflector 242 and the reflective polarizer without being substantially refracted. Without being substantially refracted means that the angle between a light ray incident on a surface and a light ray transmitted through the surface is no more than 15 degrees. In some embodiments, a light ray propagating along the optical axis 260 passes through the first and second lenses 210 and 240, the partial reflector 242, and the reflective polarizer without being refracted by more than 10 degrees, or more than 5 degrees, or more than 3 degrees, or more than 2 degrees at any major surface of the optical system 201.

In some embodiments, the optical system 201 is adapted to receive incident light and transmit a light to a viewer at a viewing location 265. Light exiting the optical system 201 is schematically illustrated by first and second light components 255 and 257.

It has been found that the optical stacks and reflective polarizers of the present description allow an optical system to achieve a higher polarization contrast than conventional optical systems. In some embodiments, for an incident cone of light 253 having the second polarization state (block state for the reflective polarizer) and a wavelength in the predetermined wavelength range and centered on the optical axis 260 with a full cone angle θ from about 100 degrees to about 160 degrees, the incident light exits the optical system having a first light component 255 having the first polarization state (pass state of the reflective polarizer) and a second light component 257 having the second polarization state. In some embodiments, a ratio of an average intensity of the first light component 255 to an average intensity of the second light component 257 is greater than about 100, or greater than about 110, or greater than about 120, or greater than about 130.

Figure 3:
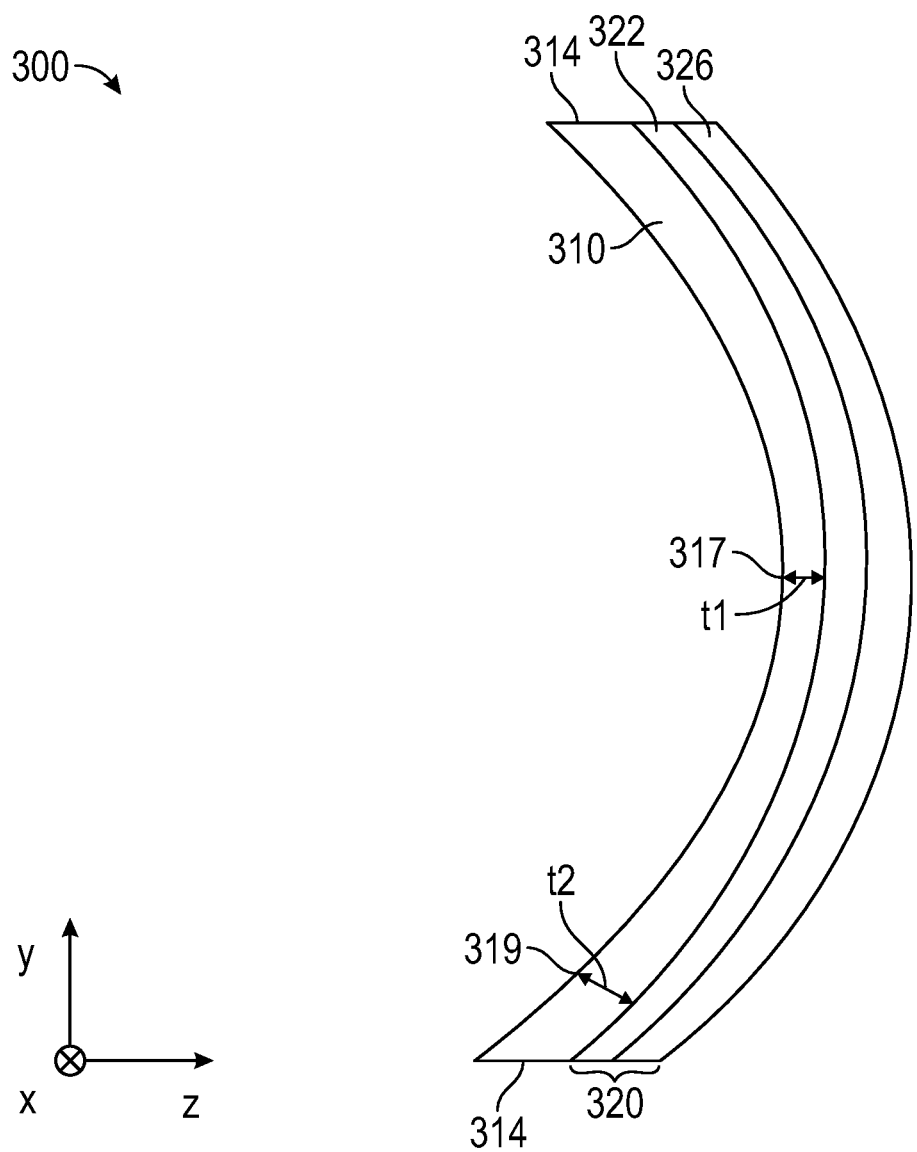
FIG. 3 is a schematic cross-sectional view of an optical component.

FIG. 3 is a schematic cross-sectional view of an optical component 300 which is in many ways similar to optical component 100. Optical component 300 includes a first optical element 310 and an optical stack 320 bonded and conforming to a curved major surface of the first optical element 310. The optical stack 320 includes first and second layers 322 and 326, one of which may be a reflective polarizer and the other may be a non-adhesive flexible optical layer. In some embodiments, the first and second layers 322 and 326 are integrally formed with each other. In other embodiments, an adhesive layer may be used to adhere the first and second layers 322 and 326 to each other. In some embodiments, the first optical element 310 is integrally formed with the optical stack 320 and in other embodiments, the optical stack 320 is adhered to the first optical element 310. The first optical element 310 is thinner (thickness t1) at a location 317 farther from an edge 314 of the first optical element 310 and thicker (thickness t2) at another location 319 closer to the edge 314 of the first optical element 310. In comparison, in optical component 100, the first optical element 110 is thicker at a location farther from an edge of the first optical element 110 and thinner at another location closer to the edge of the first optical element 110.

In some embodiments, an average thickness of the first optical element 310 or other optical elements (e.g., a second optical element or a non-adhesive flexible optical layer) is in a rage from about 50 micrometers to about 500 micrometers or from about 50 micrometers to about 100 micrometers. The average thickness of an element or a layer is the unweighted average of the thickness over a total area of the element or layer.

Figure 4:
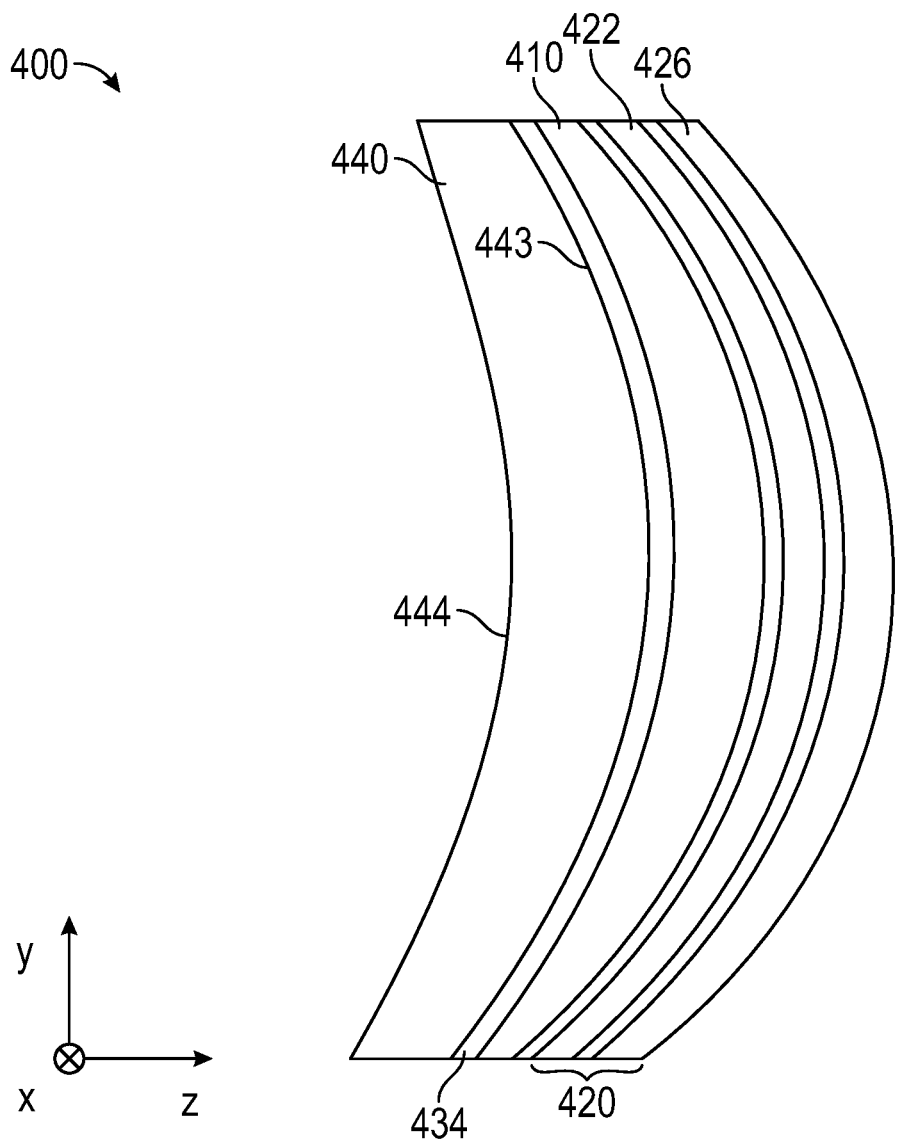
FIGS. 4-6B are schematic cross-sectional views of optical systems.
Figure 5:
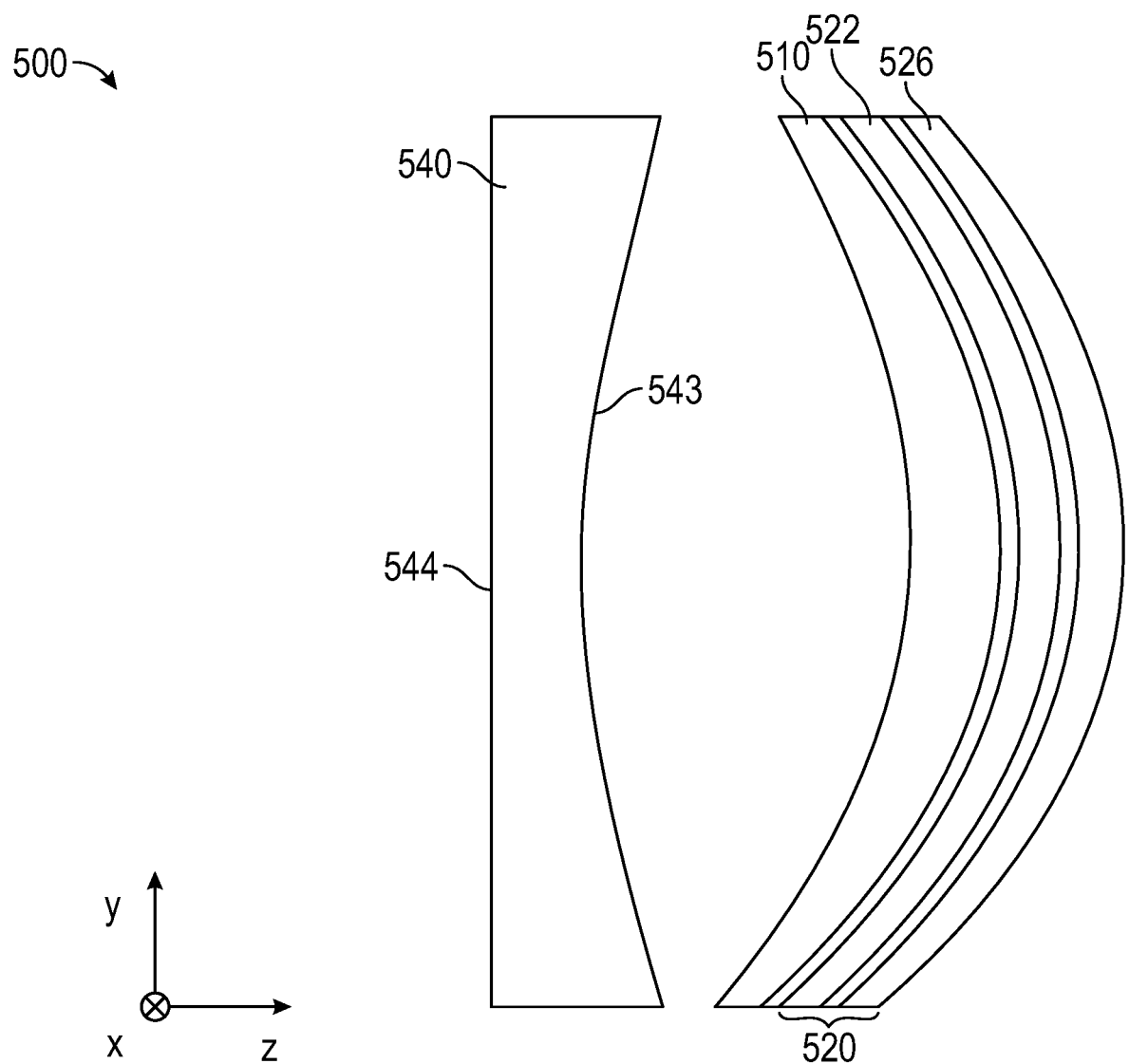

FIG. 4 is a schematic cross-sectional view of an optical system 400 including a first optical element 410 and an optical stack 420 which may be as described for optical component 100, for example. Optical stack 420 includes first and second layers 422 and 426, one of which may be a reflective polarizer and the other may be a non-adhesive flexible optical layer. The first and second layers 422 and 426 may be bonded together (e.g., with an optically clear adhesive) and the optical stack may be bonded to the first optical element 410 (e.g., with an optically clear adhesive). The optical system 400 further includes a second optical element 440 adjacent the first optical element 410 and including substantially non-parallel first and second major surface 443 and 444. In the illustrated embodiment, the first optical element 410 and the second optical element 440 are bonded together through an adhesive layer 434. In other embodiments, the first and second optical elements 410 and 440 are spaced apart from one another. This is illustrated in FIG. 5 which is a schematic cross-sectional view of optical system 500. Elements 510, 520, 522, and 526 correspond to elements 410, 420, 422, and 426, respectively. Optical system 500 includes a second optical element 540 which is disposed adjacent to and spaced apart from the first optical element 510 and which has opposing first and second major surfaces 543 and 544. In the illustrated embodiment, the second major surface 544 is substantially planar.

Figure 6A:
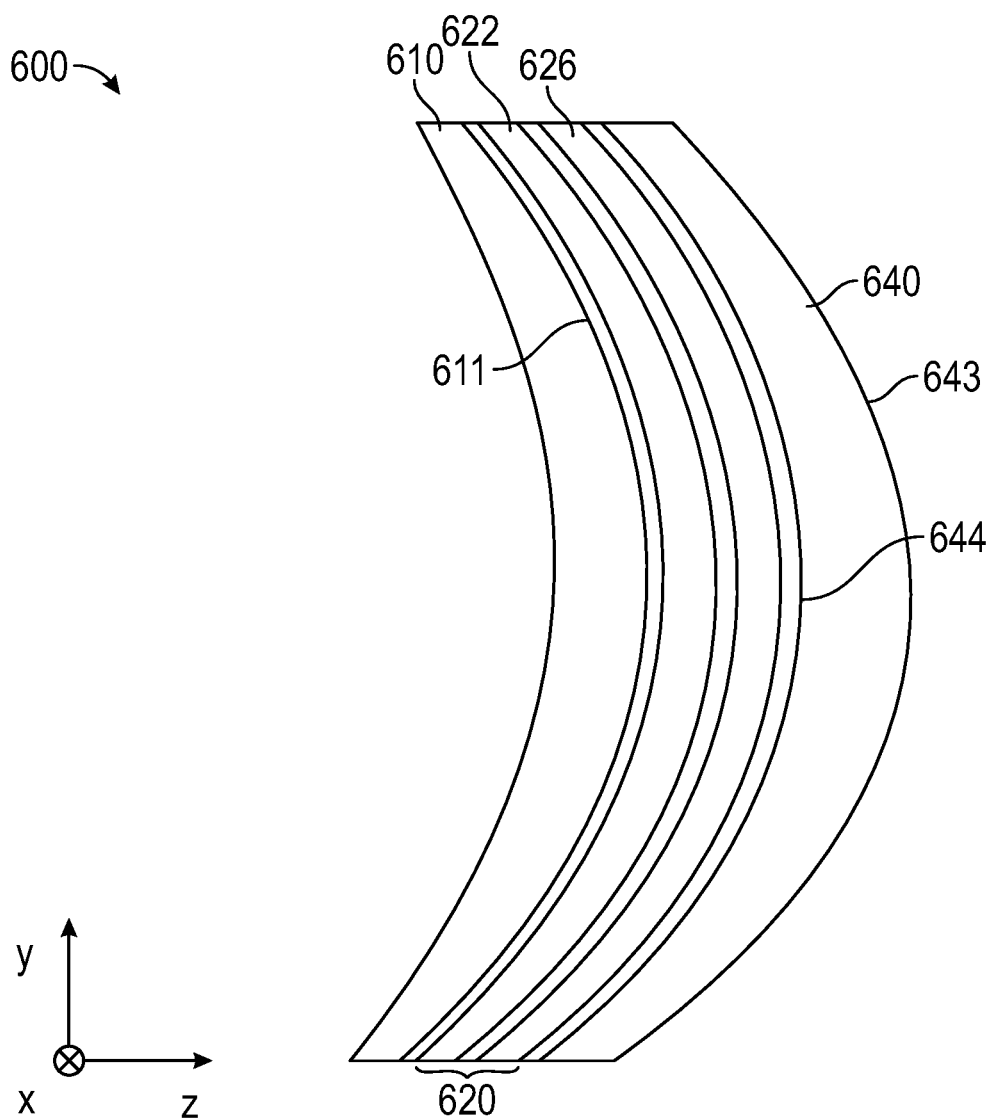

In some embodiments, the optical stack is disposed between the first and second optical elements. This is illustrated in FIG. 6A which is a schematic cross-sectional view of optical system 600. Elements 610, 620, 622, and 626 correspond to elements 410, 420, 422, and 426, respectively. Optical system 600 includes a second optical element 640 is disposed adjacent the first optical element 610 and has substantially non-parallel first and second major surfaces 643 and 644. The optical stack 620 is disposed between the first and second optical elements 610 and 640. In the illustrated embodiment, the optical stack 620 is disposed on, and conforms to, the second major surface 644 of the second optical element 640. In other embodiments, the optical stack 620 may not conform to the second major surface 644 and/or the second optical element 640 may be spaced apart from the optical stack 620. In the illustrated embodiment, the optical stack 620 is adhered to a major surface (611 and 644, respectively) of each of the first and second optical elements 610 and 640. In other embodiments, the optical stack 620 may be adhered to one and not the other of the first and second optical elements 610 and 640. In some embodiments, the optical stack 620 may be integrally formed with the first and/or second optical elements 610 and 640 via an insert molding process, for example.

Figure 6B:
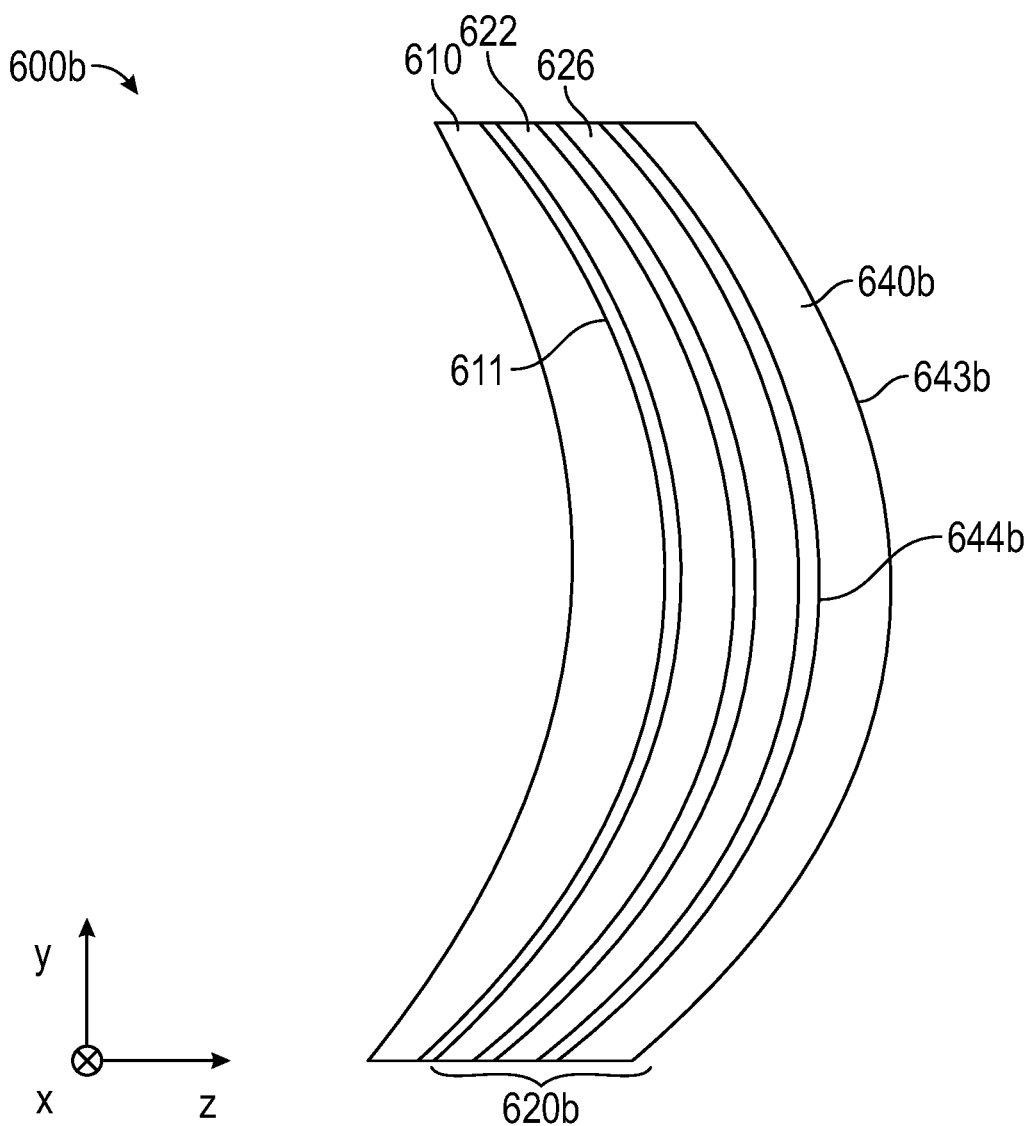

In some embodiments, second optical element 640 is replaced with a second optical layer having substantially parallel opposing major surfaces. This is illustrated in FIG. 6B which is a schematic cross-sectional view of optical system 600b. Optical system 600b corresponds to optical system 600 except that a second optical layer 640b is used instead of second optical element 640. Optical stack 620b includes first and second layers 622 and 626 and second optical layer 640b. In some embodiments, first layer 622 is a first non-adhesive flexible optical layer, second layer 626 is a reflective polarizer, and second optical layer 640b is a second non-adhesive flexible optical layer. The opposing major surfaces 643b and 644b of the second optical layer 640b may be substantially parallel.

In some embodiments, the first optical element is a first optical lens and the second optical element, if included, is a second optical lens. In some embodiments, the first optical lens and the second optical lens, if included, may be independently selected from the group consisting of biconvex, plano-convex, positive meniscus, negative meniscus, plano-concave or biconcave lenses. In other embodiments, the optical element(s) are optical prisms.

Figure 7:
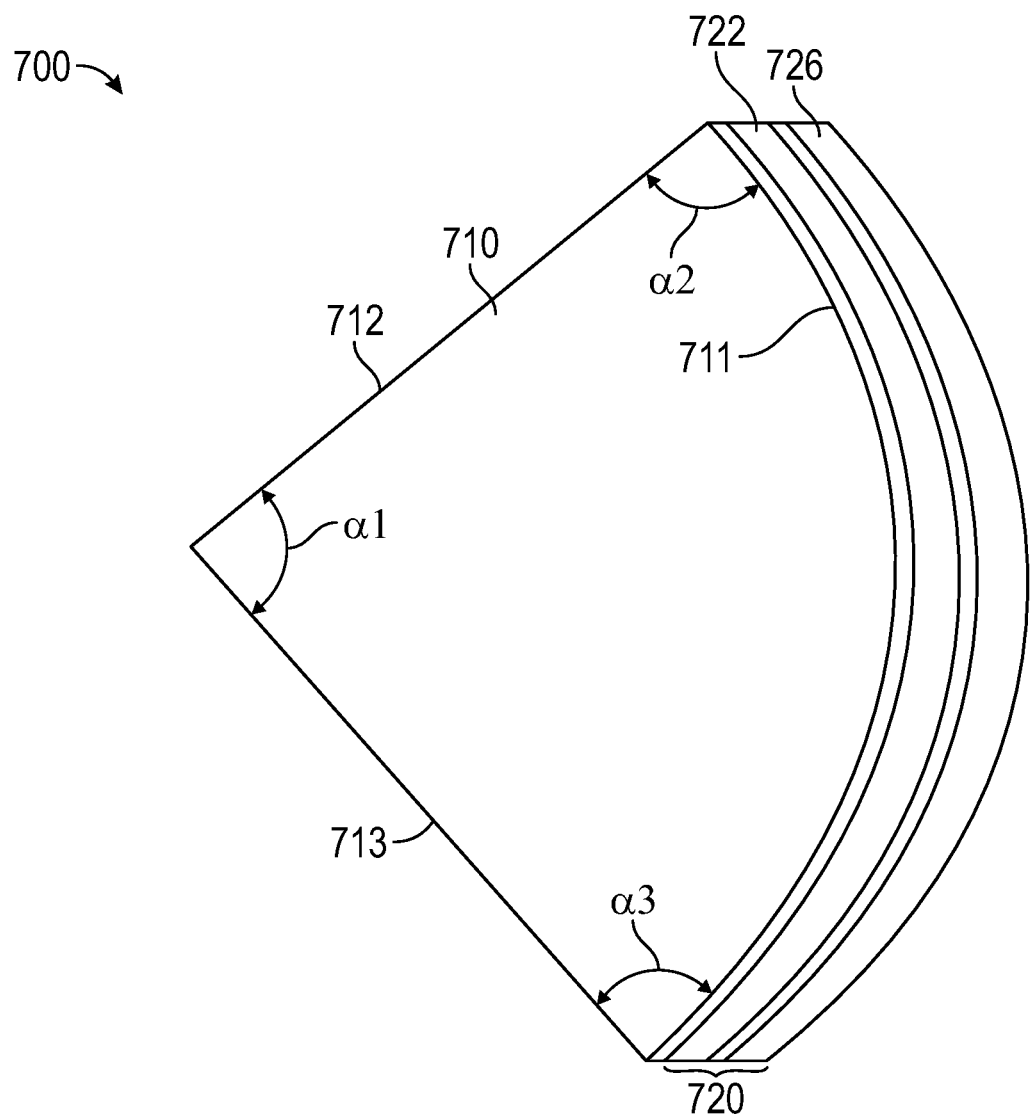
FIG. 7 is a schematic cross-sectional view of an optical component.

FIG. 7 is a schematic cross-sectional view of an optical component 700 including a first optical element 710 having a curved first major surface 711 and an optical stack 720 bonded and conforming to the curved first major surface 711. Optical stack 720 and first and second optical layers 722 and 726 may correspond to and be as described for optical stack 120 and first and second optical layers 722 and 726, respectively. For example, in some embodiments, one of the first and second optical layers 722 and 726 is a reflective polarizer and the other of the first and second optical layers 722 and 726 is a non-adhesive flexible optical layer. Optical component 700 may be a component in an optical system or may be considered to be an optical system itself. In some embodiments, optical component 700 is a polarizing beam splitter (PBS).

In the illustrated embodiment, the first optical element 710 is a first optical prism having first and second sides 712 and 713 and a hypotenuse side having the first curved major surface 711. An angle $\alpha 1$ between the first and second sides 712 and 713 may be in a range of about 85 degrees to about 95 degrees. An angle $\alpha 2$ between the first side 712 and the first curved major surface 711 may be in a range of about 40 degrees to about 50 degrees, and an angle $\alpha 3$ between the second side 713 and the first curved major surface 711 may be in a range of about 40 degrees to about 50 degrees. In some embodiments, the first optical element 710 has substantially orthogonal first and second sides 712 and 713 and a hypotenuse side (side having first curved major surface 711) intersecting each of the first and second sides 712 and 713 at substantially 45 degrees (e.g., at 40 to 50 degrees).

Figure 20:
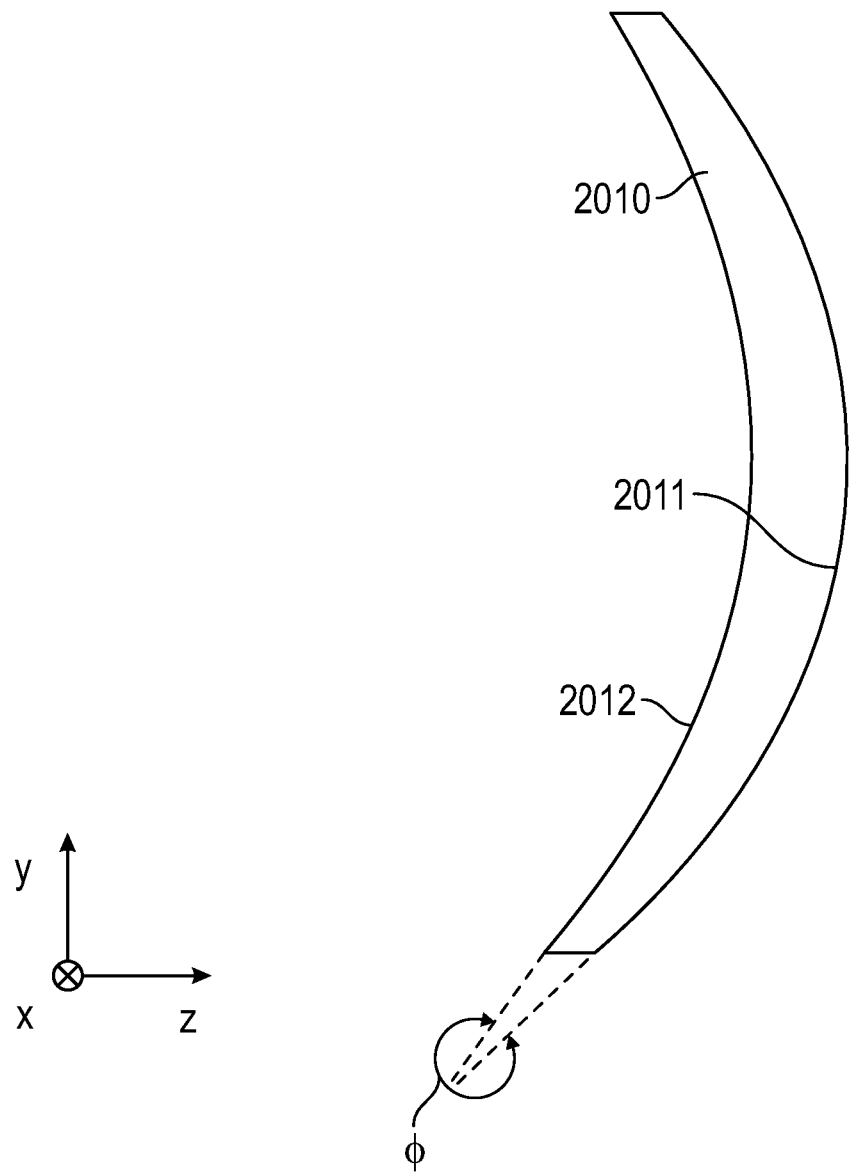
FIG. 20 is a schematic cross-sectional view of an optical element.

An angle between first and second major surfaces of an optical element is the angle between the surfaces where they meet in embodiments where the first and second major surfaces meet at an edge, for example. In embodiments where the first and second major surfaces do not meet, but are separated from each other at an edge of the optical element which provides a minor surface of the optical element, an angle between the first and second major surfaces can be defined as the angle between lines tangent to the first and second major surfaces at the edge. This is illustrated in FIG. 20 which is a schematic cross-sectional view of optical element 2010 having first and second major surfaces 2011 and 2012. The first and second major surfaces 2011 and 2012 form an angle φ therebetween. In some embodiments, φ is less than about 45 degrees, or less than about 35 degrees. In some embodiments, φ is greater than about 10 degrees or greater than about 20 degrees.

In some embodiments, the first and second major surfaces of an optical element form an angle therebetween in a range from about 20 degrees to about 120 degrees. In the case of a prism, the angle may be about 45 degrees or about 90 degrees, for example, depending on the geometry of the prism and on which side (first major surface) of the prism the optical stack or reflective polarizer is disposed. In the case of an optical lens, the angle may be from about 20 degrees to about 40 degrees, for example.

Figure 8:
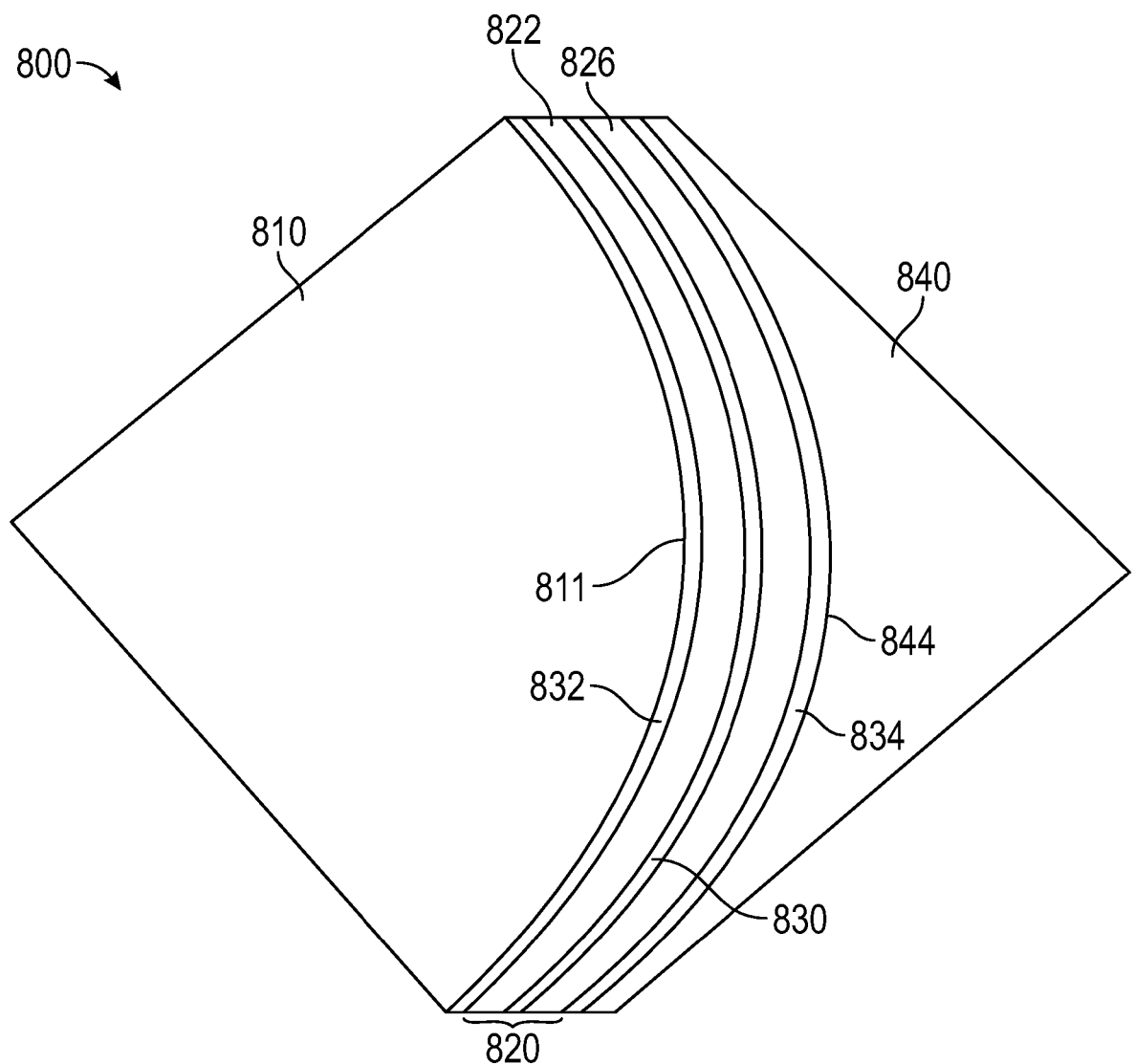
FIGS. 8-9 are schematic cross-sectional views of polarizing beam splitters.

FIG. 8 is a schematic cross-sectional view of a polarizing beam splitter 800 including a first prism 810 having a first hypotenuse 811; a second prism 840 having a second hypotenuse 844 facing the first hypotenuse 811; and an optical stack 820 disposed between and adhered to the first and second hypotenuses 811 and 844. The optical stack 820 is adhered to the first hypotenuse 811 through adhesive layer 832 and is adhered to the second hypotenuse 844 through adhesive layer 834. The first and second layers 822 and 826 of the optical stack 820 are adhered to one another through adhesive layer 830. The optical stack 820 may correspond to optical stack 120, for example. For example, in some embodiments, the optical stack 820 includes a reflective polarizer (one of the first and second layers 822 and 826) substantially transmitting light having a first polarization state and substantially reflecting light having an orthogonal second polarization state; and a non-adhesive flexible optical layer (the other of the first and second layers 822 and 826) bonded to the reflective polarizer and having substantially parallel opposing first and second major surfaces. The adhesive layer 830 is disposed between and bonds the reflective polarizer to the non-adhesive flexible optical layer.

Figure 9:
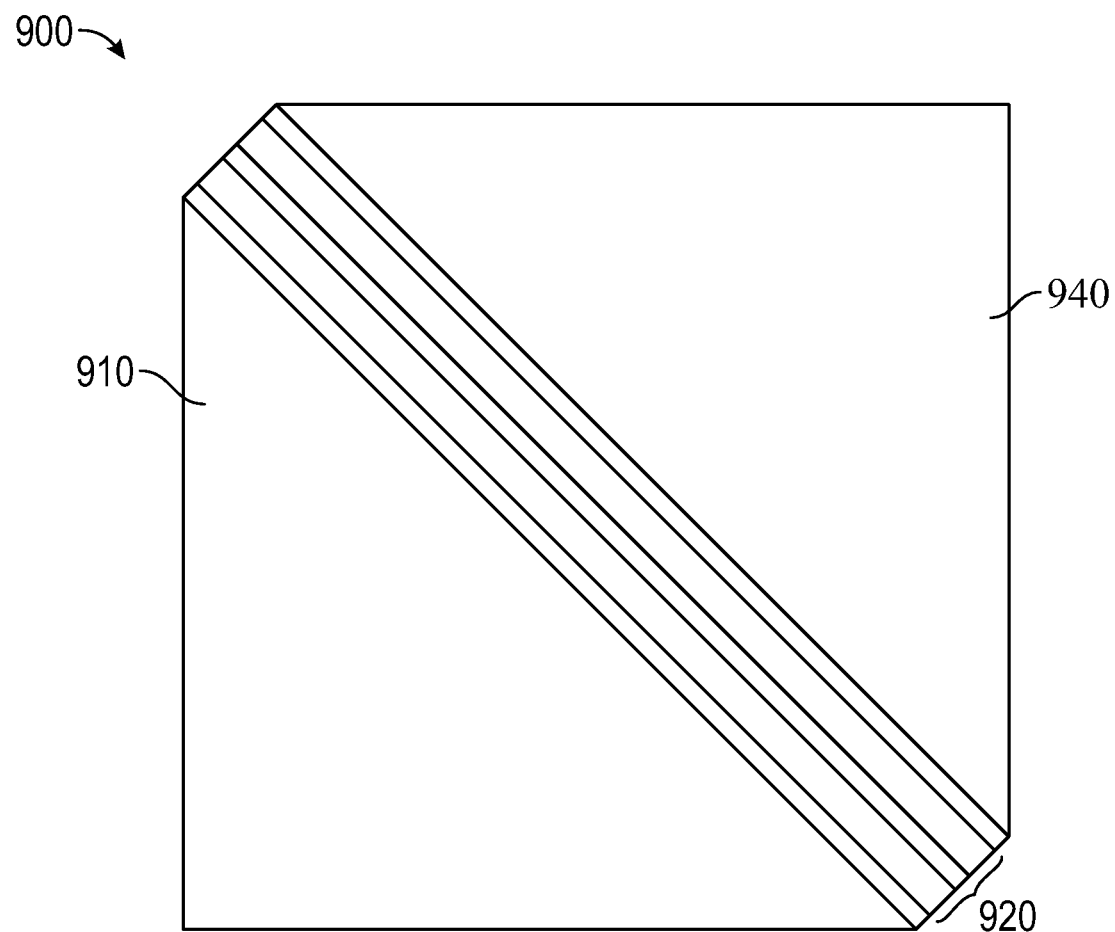

FIG. 9 is a schematic cross-sectional view of a polarizing beam splitter 900 which is in many ways similar to polarizing beam splitter 800 except that the hypotenuses of the first and second prisms 910 and 940 are substantially planar and that the optical stack 920 is substantially planar. The layers of the optical stack 920 may be as described for optical stack 820 except that the layers of the optical stack 920 are substantially planar. For example, the optical stack 920 may include a reflective polarizer and a non-adhesive flexible optical layer bonded together through an adhesive layer. The optical stack 920 may be bonded to each of the first and second prisms 910 and 940 through respective adhesive layers.

In some embodiments, the optical stack 820 or 920 includes a second non-adhesive flexible optical layer. For example, the optical stack 820 or 920 may correspond to optical stack 620b and may include a reflective polarizer disposed between first and second non-adhesive flexible optical layers.

In some embodiments, a polarizing beam splitter includes first and second prisms where one of the prisms has a curved hypotenuse and the other prism has a substantially planar hypotenuse. In this case, the optical stack may conform to one hypotenuse, or may not conform to either hypotenuse, and an adhesive layer having a non-uniform thickness may be used to bond the optical stack to a hypotenuse that it does not conform to.

Figure 10:
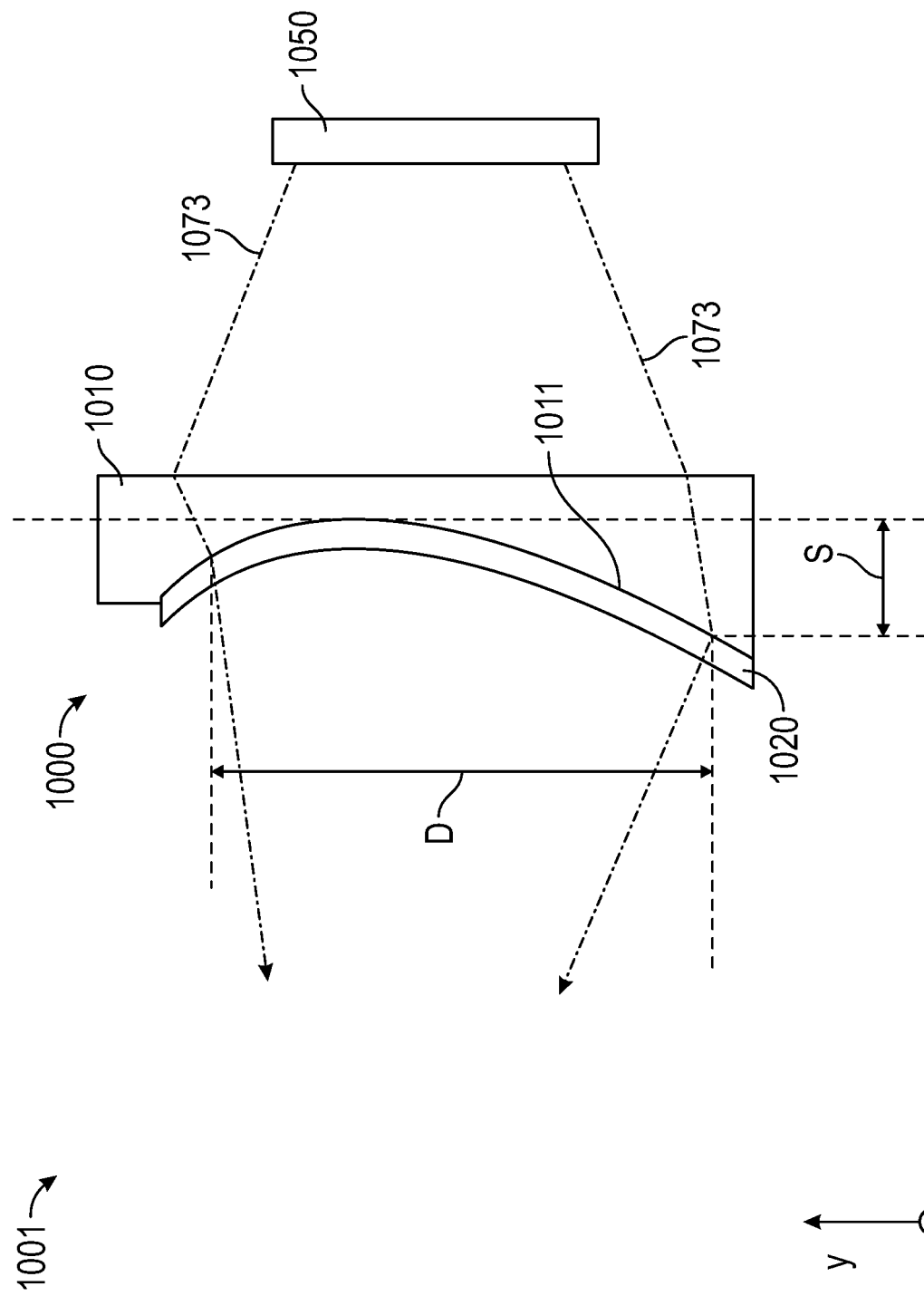
FIG. 10 is a schematic cross-sectional view of an optical system.

FIG. 10 is a schematic cross-sectional view of an optical system 1001 including a lens assembly 1000 and a display panel 1050. The lens assembly 1000 includes a first optical lens 1010 having an optical power in at least one direction and a curved first major surface 1011. The lens assembly 1000 further includes an optical layer 1020 disposed on the first major surface 1011. In some embodiments, the optical layer 1020 is adhered to and conforms to the first major surface 1011. In some embodiments, the optical layer 1020 is any of the optical stacks described elsewhere herein. For example, in some embodiments, the optical layer 1020 includes a reflective polarizer substantially transmitting light having a first polarization state and substantially reflecting light having an orthogonal second polarization state; and includes a non-adhesive flexible optical layer bonded (e.g., via an adhesive layer) to the reflective polarizer and having substantially parallel opposing first and second major surfaces. In some embodiments, optical layer 1020 is an integrally formed reflective polarizer including a plurality of interference layers where each interference layer reflects or transmits light primarily by optical interference. In some embodiments, the reflective polarizer adhered to the first major surface 1011 of the first optical lens 1010.

The display panel 1050 emits a light 1073 which determines an active region of the first major surface 1011 which has a maximum projected dimension D and a corresponding maximum sag S. D is the maximum dimension of a projection of the active region onto a plane, maximized over the planes and over dimensions in the planes. S is the maximum sag which is measured in a direction orthogonal to the plane in which the projected dimension is maximized. In the illustrated embodiment, the projected dimension is a maximum in the x-y plane and S along the z-axis. In embodiments, where the optical system 1001 has an optical axis, the maximum projected dimension typically occurs when the projection in onto a plane perpendicular to the optical axis and the maximum sag is typically along the optical axis. In some embodiments, S/D is greater than or equal to about 0.03, or greater than or equal to about 0.05, or greater than or equal to about 0.1. In some embodiments, S/D is no more than about 0.5.

Figure 11:
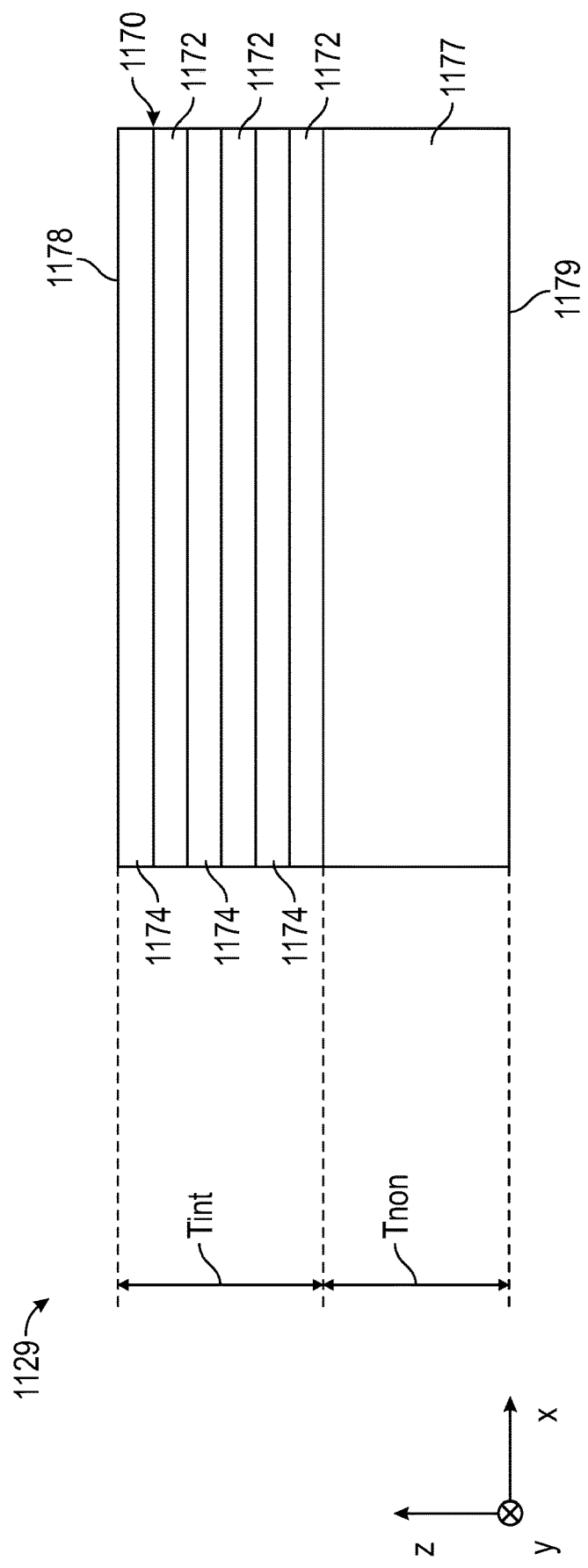
FIG. 11 is a schematic cross-sectional view of an integrally formed reflective polarizer.

FIG. 11 is a schematic cross-sectional view of an integrally formed reflective polarizer 1129 including a plurality of interference layers 1170 and a noninterference layer 1177. In some embodiments, the plurality of interference layers includes alternating polymeric layers 1172 and 1174. In the illustrated embodiment, a single noninterference layer 1177 is included. Interference layers may be described as reflecting or transmitting light primarily by optical interference when the reflectance and transmittance of the interference layers can be reasonably described by optical interference or reasonably accurately modeled as resulting from optical interference. Such interference layers are described in U.S. Pat. No. 5,882,774 (Jonza et al.), and U.S. Pat. No. 6,609,795 (Weber et al.), for example. Adjacent pairs of interference layers having differing refractive indices reflect light by optical interference when the pair has a combined optical thickness (refractive index times physical thickness) of ½ the wavelength of the light. Interference layers typically have a physical thickness of less than about 200 nanometers. Noninterference layers have an optical thickness too large to contribute to the reflection of visible light via interference. Typically, noninterference layers have a physical thickness of at least 1 micrometer. In some embodiments, more than one noninterference layer is included. In some embodiments, the plurality of interference layers 1170 is disposed on a same side of the at least one noninterference layer 1177. In some embodiments, at least one noninterference layer (noninterference layer 1177 in the illustrated embodiment) is integrally formed with the plurality of interference layers 1170 and does not reflect or transmit light primarily by optical interference. In some embodiments, noninterference layer 1177 is a non-adhesive flexible optical layer as described further elsewhere herein. In some embodiments, the reflective polarizer 1129 has a different reflectivity for light in the block state incident from the first major side 1178 than for light in the block state incident from the second major side 1179, as described further elsewhere herein.

An average total thickness of the plurality on interference layers 1170 is Tint and an average total thickness of the at least one noninterference layer 1177 is Tnon. In some embodiments, Tint is in a range from about 20 micrometers to about 70 micrometers and Tnon is in a range from about 40 micrometers to about 100 micrometers. The total thickness may vary if the surface of one or more noninterference layer is structured, for example. The total thickness may also vary due to ordinary manufacturing variations, for example. The average total thickness is the unweighted average of the thickness over the area of the layers. In some embodiments, the average total thickness (Tint+Tnon) of a reflective polarizer is at least 50 micrometers, or at least 60 micrometers, or at least 70 micrometers. In some embodiments, the reflective polarizer 1129 is substantially uniaxially oriented. In some embodiments, the layers 1172 are substantially uniaxially oriented along the x-axis, for example, and the layers 1174 are substantially isotropic. In this case, the block polarization state for normally incident light is typically the polarization state with light polarized along the x-axis and the pass polarization state for normally incident light is typically the polarization state with light polarized along the y-axis.

Figure 12:
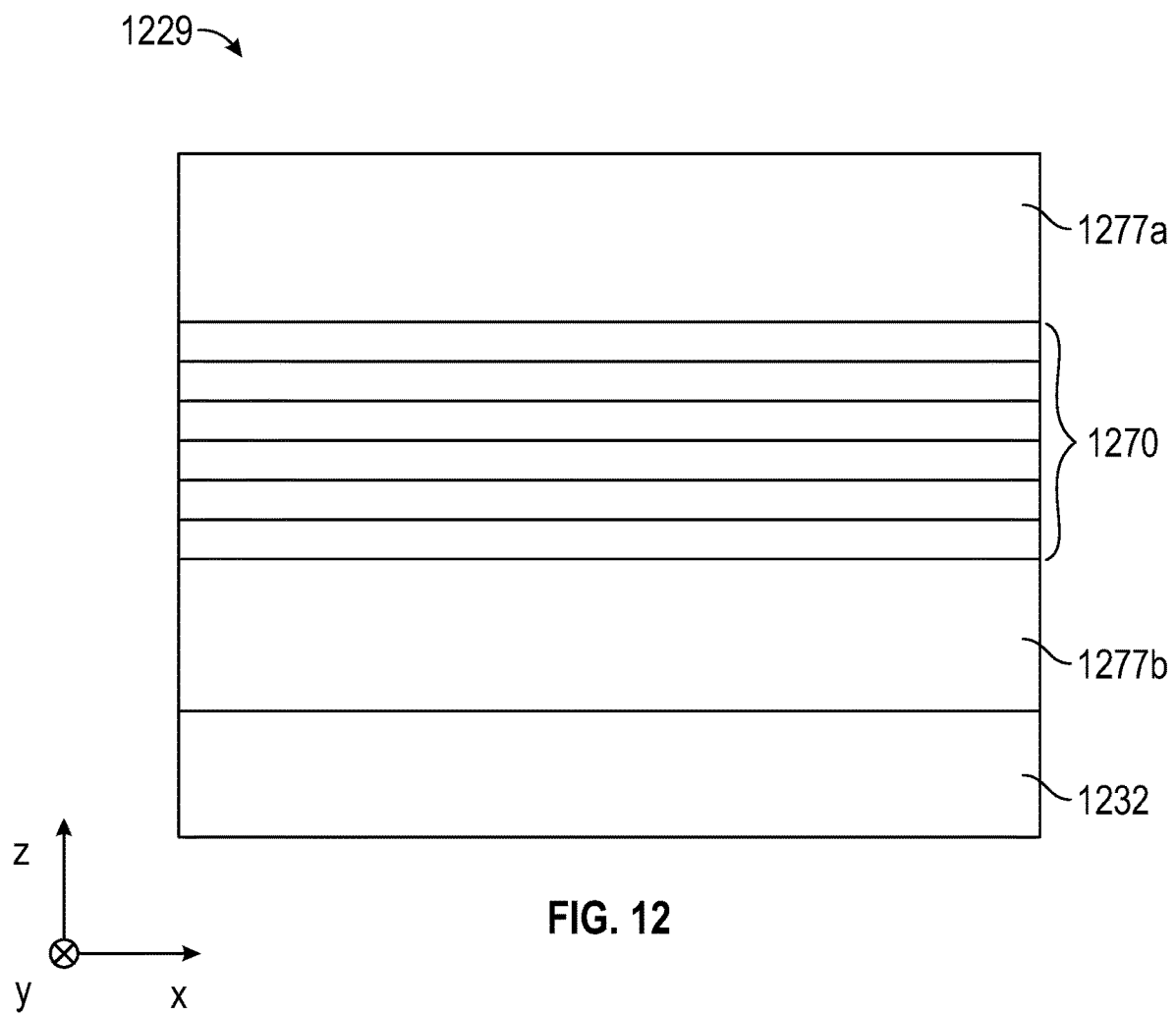
FIGS. 12-13 are schematic cross-sectional views of optical films.

FIG. 12 is a schematic illustration of an optical film 1229 including a plurality of interference layers 1270 and at least one noninterference layer 1277a and 1277b integrally formed with the plurality of interference layers 1270. The average total thickness of the at least one noninterference layer 1277a and 1277b is the sum of the thicknesses of the noninterference layer 1277a and 1277b. The optical film 1229 further includes an adhesive layer 1232 which can be used to adhere the film to an optical element such as an optical lens, for example. Optical film 1229 includes at least one noninterference layer on each side of the plurality of interference layers 1270. In some embodiments, for substantially normally incident light in a predetermined wavelength range, the plurality of interference layers 1270 has an average optical transmittance greater than about 85% for a first polarization state, and an average optical reflectance greater than about 80% for an orthogonal second polarization state.

Figure 13:
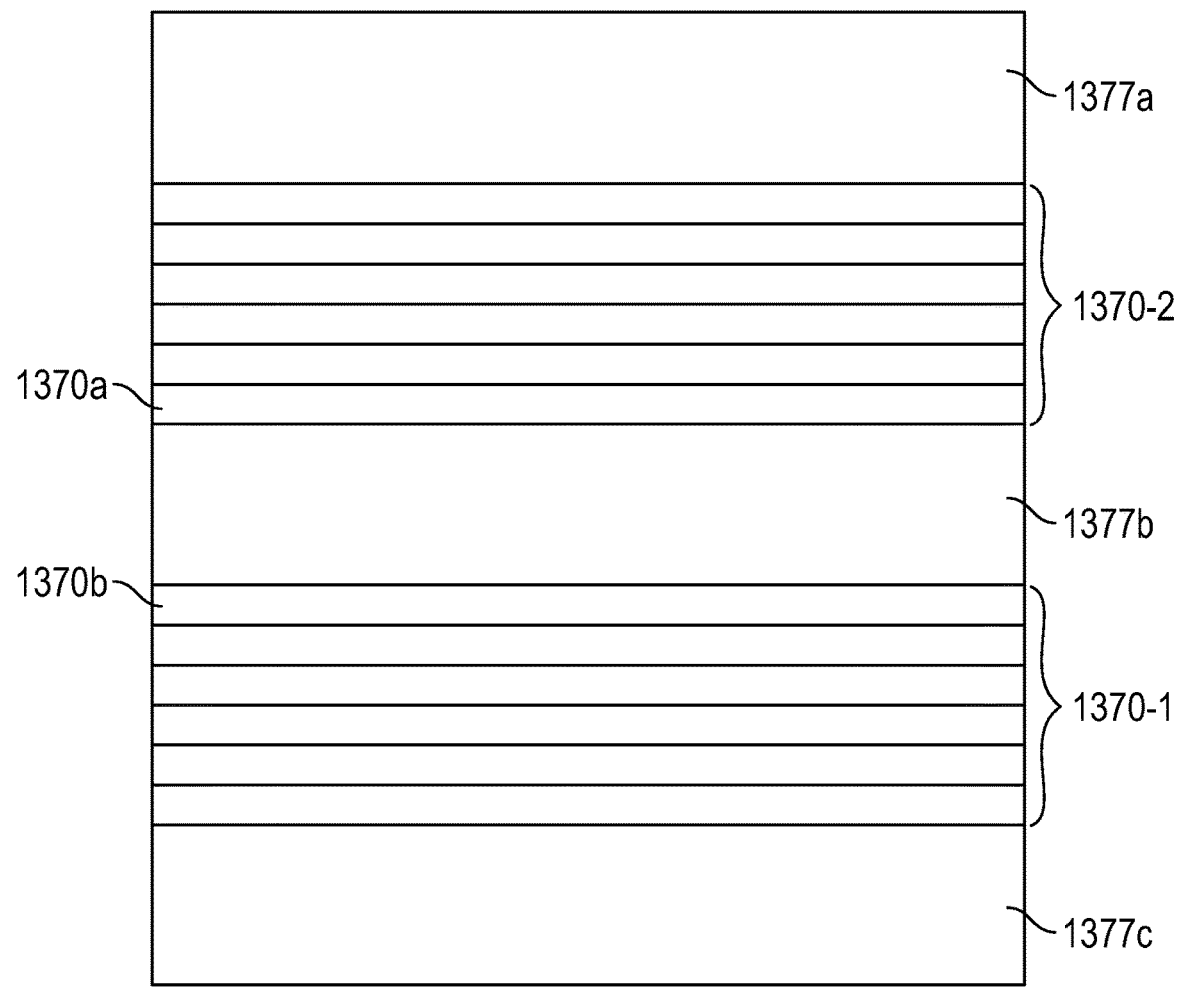

FIG. 13 is a schematic illustration of an optical film 1329 including a plurality of interference layers which are arranged in a first packet 1370-1 and a second packet 1370-2, and a plurality of noninterference layers 1377a, 1377b and 1377c integrally formed with the plurality of interference layers. At least one noninterference layer 1377b is disposed between two interference layers 1370a and 1370b in the plurality of interference layers. Optical film 1329 may be a reflective polarizer having an average optical transmittance and reflectance as described further elsewhere herein. In some embodiments, the first packet 1370-1 and second packet 1370-2 have a thickness distribution which overlaps.

In some embodiments, optical film 1229 or 1329 is a reflective polarizer which is substantially uniaxially oriented and which has an average total thickness (Tint+Tnon) of a reflective polarizer is at least 50 micrometers, or at least 60 micrometers, or at least 70 micrometers.

In some embodiments, the at least one noninterference layer includes a non-adhesive flexible optical layer comprising substantially parallel opposing first and second major surfaces, the non-adhesive flexible optical layer having an optical retardance in any of the ranges described elsewhere herein (e.g., less than 100 nm or greater than 200 nm).

Figure 14A:
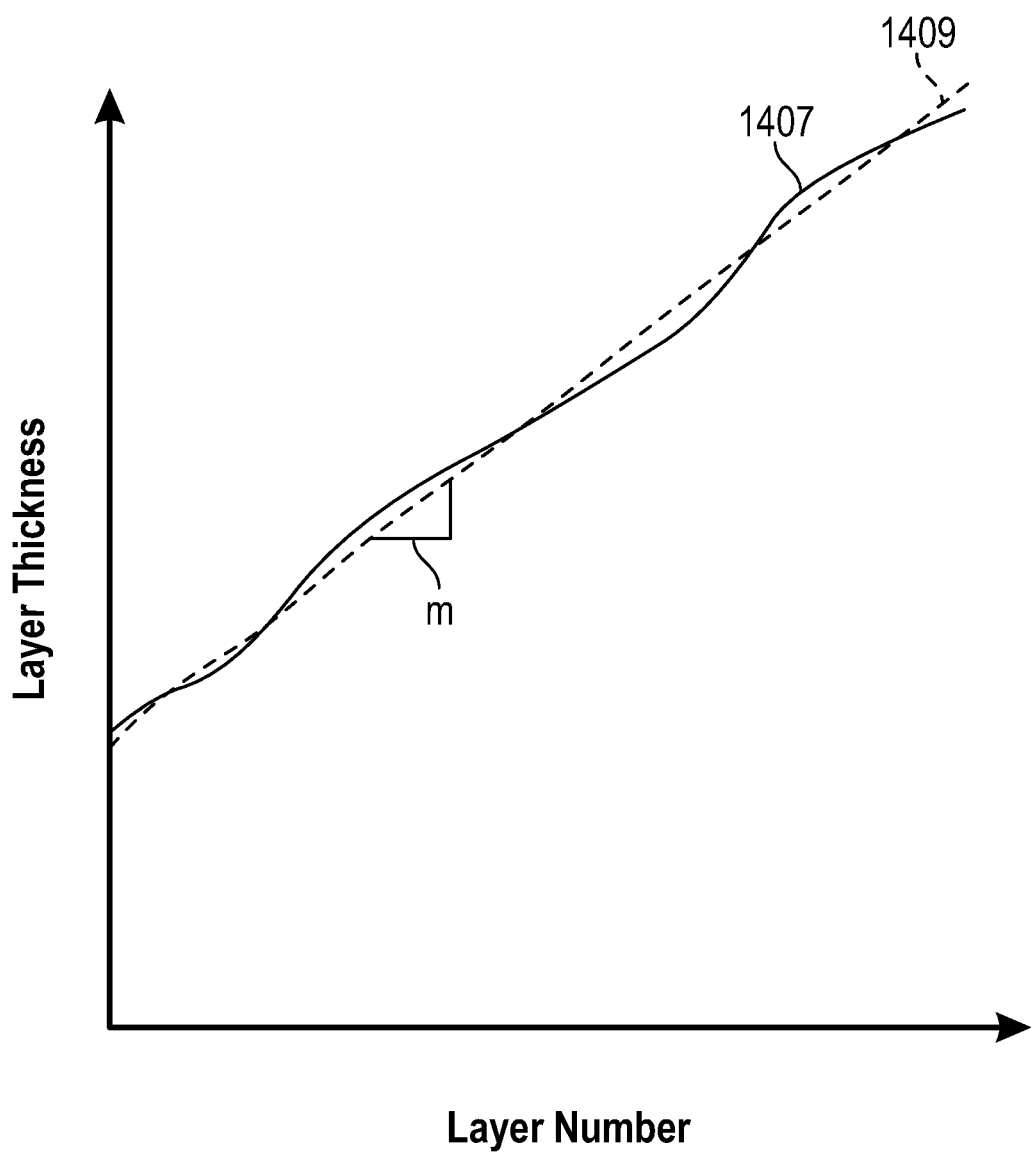
FIG. 14A is a schematic illustration of a layer thickness as a function of layer number of a reflective polarizer.

In some embodiments, a reflective polarizer includes N sequentially numbered layers with each of the layers having a thickness less than about 200 nm. For example, interference layers 1170 may be sequentially numbered from 1 for the layer immediately adjacent non-interference layer 1177 to N for the layer immediately adjacent first major side 1178. In some embodiments, N is an integer greater than 200 and less than 800. FIG. 14A schematically illustrates a layer thickness 1407 as a function of layer number. A fitted curve 1409 having an average slope m is also illustrated. The fitted curve 1409 is a best-fit regression applied to the layer thickness of the reflective polarizer as a function of layer number. In some embodiments, the average slope m of the fitted curve in a region extending from the first layer to the Nth layer is less than about 0.2 nm. In some embodiments, the N sequentially numbered layers exclude any non-interference layers, spacer layers, or other optional optical layers that do not form part a stack/packet in the reflective polarizer. In some embodiments, the fitted curve 1409 is one or more of a best-fit linear regression, a best-fit non-linear regression, a best-fit polynomial regression, and a best-fit exponential regression. In some embodiments, the best-fit regression is a linear least-squares fit and the average slope is the slope of the linear least squares fit. In some embodiments, additional layers are included at the end adjacent to layer number 1 and/or and the end of layer number N. The additional layers may not follow an approximately linear trend line from the first to the Nth layer and be included to provide sharpened band edges as described in U.S. Pat. Appl. Publ. No. 2005/0243425 (Wheatley et al.), for example.

Figure 14B:
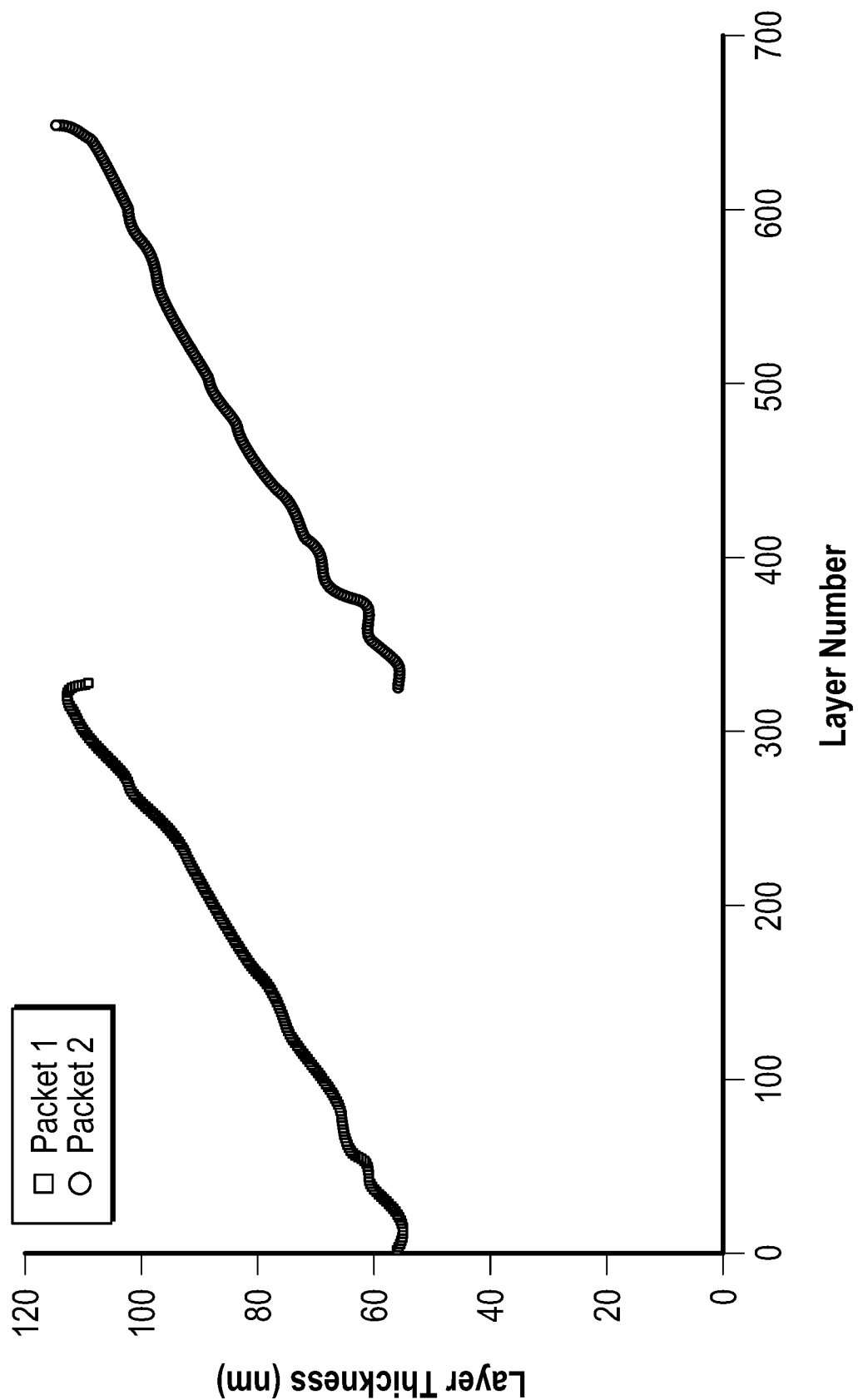
FIGS. 14B-14C are plots of layer thickness versus layer number for reflective polarizers including two packets of interference layers.
Figure 14C:
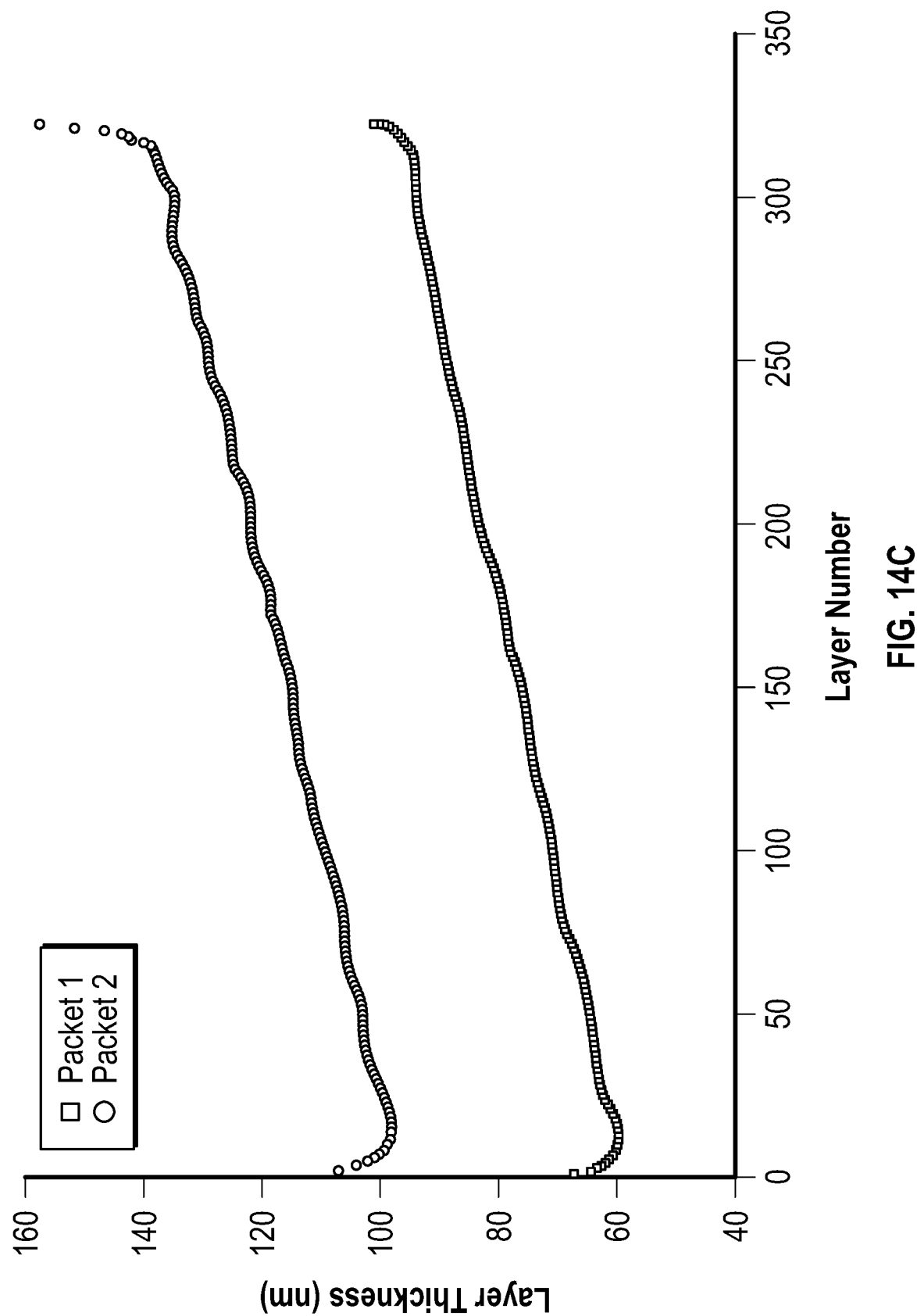

In some embodiments, the reflective polarizer includes a plurality of packets (e.g., packet 1370-1 and 1370-2) where each packet has a layer thickness versus layer number that is a substantially continuous curve. FIG. 14B illustrates a layer thickness versus layer number for a reflective polarizer including two packets (Packet 1 and Packet 2). In some embodiments, the thickness profiles substantially overlap (e.g., greater than 50 percent of a thickness range of Packet 1 overlaps greater than 50 percent of a thickness range of Packet 2). In other embodiments, there is little or no overlap in the thickness ranges. In FIG. 14B, the thickness profiles for the two packets substantially overlap. FIG. 14C illustrates a layer thickness versus layer number for a reflective polarizer including two packets (Packet 1 and Packet 2) where there is little or substantially no overlap in the thickness ranges of the two packets. In FIG. 14B, the interference layers of the first packet are numbered from 1 to 325 and the interference layers of the second packet are numbered from 326 to 700. In FIG. 14C, the interference layers of each of the first and second packets are numbered from 1 to 325. In some embodiments, each packet has a layer thickness profile with an average slope m of a fitted curve to the thickness profile that is less than about 0.2 nm.

In some embodiments, the layer thickness profile may be characterized by a best-fit linear equation applied to the thickness profiles of each packet as a function of layer number of sequentially numbered interference layers. In some embodiments, each packet has a best-fit thickness profile with a similar slope (e.g., within 20% of each other). In some embodiments, the maximum difference between the average slopes of best-fit linear regression for all packets within a reflective polarizer is less than about 20%. Such reflective polarizers are described further in U.S. Prov. Pat. Appl. No. 62/467,712 (Haag et al.), filed Mar. 6, 2017.

Figure 15:
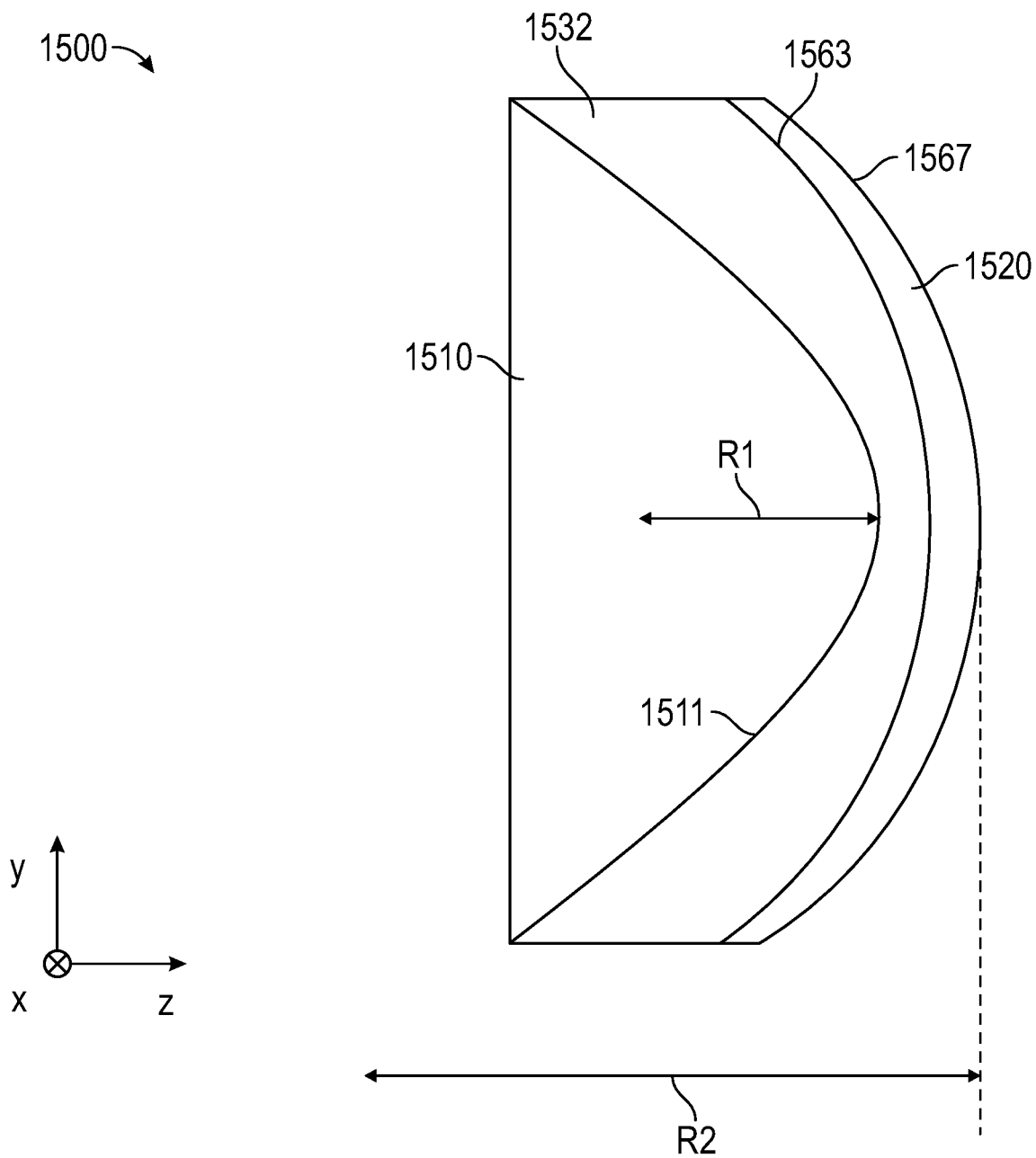
FIGS. 15-16 are schematic cross-sectional views of lens assemblies.

FIG. 15 is a schematic cross-sectional view of lens assembly 1500 including a first optical lens 1510 having a curved major first surface 1511, an optical film 1520 having opposing outermost major first and second surfaces 1563 and 1567, and an adhesive layer 1532 bonding the major first surface 1523 of the optical film 1520 to the major first surface 1511 of the first optical lens 1510. In some embodiments, the first major surface 1511 of the first optical lens 1510 has an undesired characteristic (e.g., curvature or surface roughness) and the bonding compensates for the undesired characteristic of the first major surface 1511 of the first optical lens 1510. In some embodiments, the optical film 1520 is an optical stack including a reflective polarizer and a non-adhesive flexible optical layer bonded to the reflective polarizer as described further elsewhere herein. In some embodiments, the optical film 1520 is or includes an integrally formed reflective polarizer. In some embodiments, the integrally formed reflective polarizer includes a plurality of interference layers, each interference layer reflecting or transmitting light primarily by optical interference.

In some embodiments, the first major surface 1511 of the first optical lens 1510 has an undesired characteristic which includes surface curvature. For example, in some embodiments, the curved major first surface 1511 of the first optical lens 1510 has an undesired curvature 1/R1 where R1 is a radius of curvature of the major first surface 1511. In some embodiments, the bonding of the optical film 1520 to the major first surface 1511 compensates for the undesired curvature since the outermost major second surface 1567 of the optical film 1520 may have a desired curvature 1/R2 where R2 is a radius of curvature of the outermost major second surface 1567.

Figure 16:
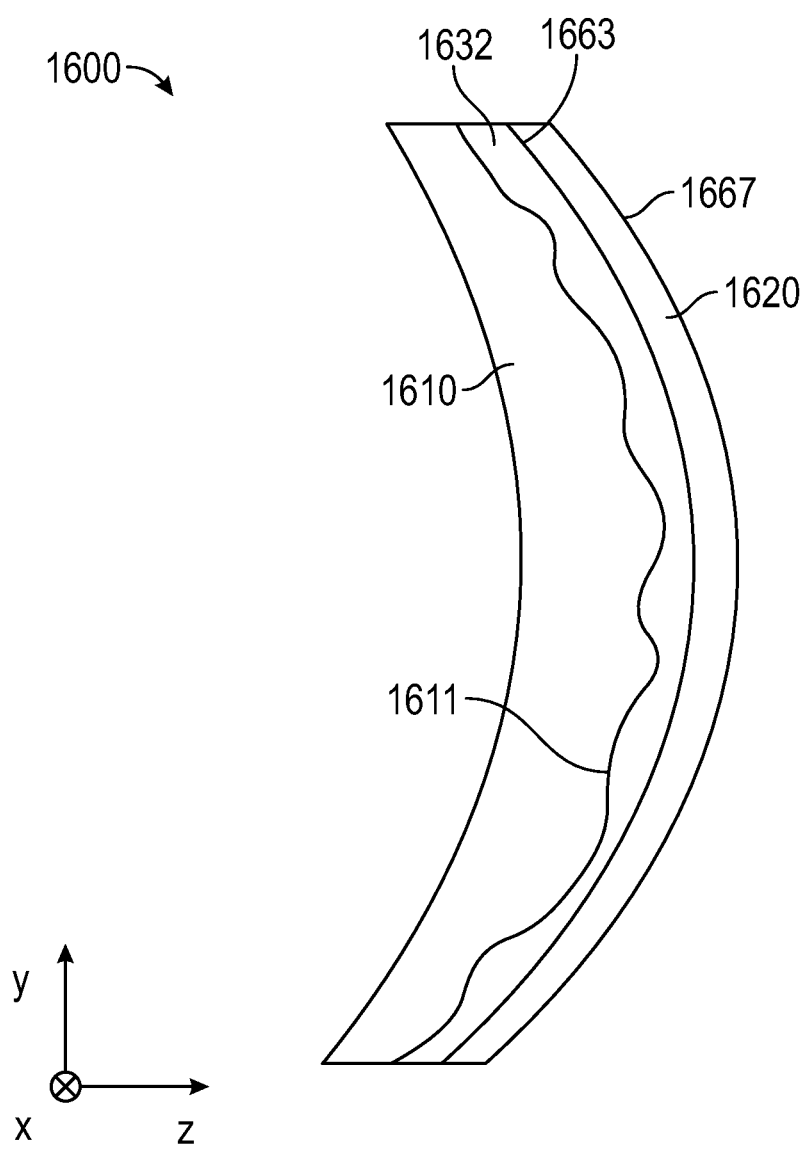

FIG. 16 is a schematic cross-sectional view of lens assembly 1600 including a first optical lens 1610 having a curved major first surface 1611; an integrally formed reflective polarizer 1620 including a plurality of interference layers, where each interference layer reflects or transmits light primarily by optical interference, and having opposing major first and second outermost surfaces 1663 and 1667; and an adhesive layer 1632 bonding the major first surface 1623 of the integrally formed reflective polarizer 1620 to the major first surface 1611 of the first optical lens 1610. In the illustrated embodiment, the first major surface 1611 of the first optical lens 1610 has an undesired characteristic which includes average surface roughness. The bonding of the integrally formed reflective polarizer 1620 to the first optical lens 1610 compensates for the undesired average surface roughness of the first major surface 1611 of the first optical lens 1610 by providing a desired average surface roughness. In some embodiments, the integrally formed reflective polarizer is replaced with an optical stack described elsewhere herein including a reflective polarizer and at least one non-adhesive flexible optical layer is bonded to the first optical lens. The outermost major surface of the optical stack opposite the first optical lens may have properties described herein for the second outermost surface 1667.

In some embodiments, the average surface roughness is the roughness parameter Ra which is a mean of the absolute value of the deviation of the surface from a mean surface (smooth surface neglecting the surface roughness). In some embodiments, the first major surface 1611 has an average surface roughness Ra of greater than about 200 nm, or greater than about 150 nm, and the second outermost surface 1667 has a surface roughness Ra of less than about 100 nm, or less than about 50 nm. In some embodiments, the first major surface 1611 is not optically smooth (e.g., light can scatter due to the surface roughness) and the second major second surface 1667 is optically smooth.

In some embodiments, two or more layers (e.g., two immediately adjacent layers) in a lens assembly or optical stack or optical system are substantially index matched. Substantially indexed matched layers have refractive indices such that an absolute value of a difference in the refractive indices is less than about 0.20. Refractive indices are determined at a wavelength of 550 nm unless specified differently.

In some embodiments, an absolute value of a difference between indices of refraction of the first optical lens 1610 and the adhesive layer 1632 is less than about 0.20, or less than about 0.15, or less than about 0.10, or less than about 0.08, or less than about 0.06, or less than about 0.04, or less than about 0.02, or less than about 0.01. In any of the embodiments described herein where an adhesive layer bonds an optical stack or a reflective polarizer to an optical element such as a lens or a prism, an absolute value of a difference between indices of refraction of the optical element and the adhesive layer may be in any of these ranges.

In some embodiments, the optical films (e.g., optical stacks, reflective polarizers), or the pluralities of interference layers in the optical films, of the present description have an average optical transmittance greater than about 85% for a first polarization state and an average optical reflectance greater than about 80% for an orthogonal second polarization state. In some embodiments, the average optical transmittance is greater than about 85% for a first polarization state for light normally incident on the optical film from one or both sides of the optical film. In some embodiments, the average optical reflectance is greater than about 80% for the second polarization state for light normally incident on the optical film from one or both sides of the optical film. In some embodiments, an optical film has an average optical absorption of greater than about 2%, or 5%, or 10% for the second polarization state, such that for substantially normally incident light in the predetermined wavelength range, the optical film has a greater average optical reflectance for light incident from a first major side of the optical film and a smaller average optical reflectance for light incident from an opposite second major side of the optical film. In other embodiments, the average optical absorption is less than about 1% so that the average optical transmittance and average optical reflectance are about the same from either side of the optical film. For example, referring to FIG. 11, some of the interference layers 1170 closer to the noninterference layer 1177 may have a higher absorbance for the second polarization state than layers farther from the non-interference layer 1177, so that the optical film has a greater average reflectivity for light having the second polarization state that is incident on the first major side 1178 than for light having the second polarization state that is incident on the second major side 1179 due to the higher absorption of light having the second polarization state that is incident on the second major side 1179.

A difference in average optical reflectance of light incident on the opposing major sides of the optical film can be achieved by including light absorbing molecules in at least some layers in the plurality of interference layers of the optical film. In some embodiments, the plurality of interference layers includes a plurality of light absorbing molecules oriented substantially along the second polarization state. In some embodiments, the plurality of light absorbing molecules have an absorption band at least partially within the predetermined wavelength range. The light absorbing molecules can be oriented along by including the light absorbing molecules in at least some of the layers in a film prior to orienting the film by stretching (e.g., substantially uniaxially stretching) the film. The light absorbing molecules can then be aligned when the film is stretched. In some embodiments, the plurality of interference layers includes pluralities of alternating higher index first and lower index second layers. For example, layers 1174 may be higher index layers and layers 1172 may be lower index layers. In some embodiments, the first layers are substantially more light absorbing than the second layers for at least one wavelength in the predetermined wavelength range. For example, the first layers may have an absorbance at least 2 times, or at least 5 times, or at least 10 times that of the second layers. In some embodiments, the first layers have substantially higher concentration of light absorbing molecules and the second layers have substantially lower concentration of light absorbing molecules. Reflective polarizers incorporating light absorbing molecules are described, for example in U.S. Pat. Appl. Publ. No. 2016/0306086 (Haag et al.) and U.S. Pat. No. 6,096,375 (Ouderkirk et al.), each of which is incorporated herein by reference to the extent that it does not contradict the present description.

Suitable light absorbing molecules include anthraquinone dyes, azo dyes, and dichroic dyes (e.g., PD-325H, PD-335H, PD-104 and PD-318H) available from Mitsui Fine Chemicals, Japan. The plurality of light absorbing molecules may be a plurality of a common type of molecules (e.g., a single type of dichroic dye) or may include pluralities of different types of molecules (e.g., a mixture of dichroic dyes).

Figure 17:
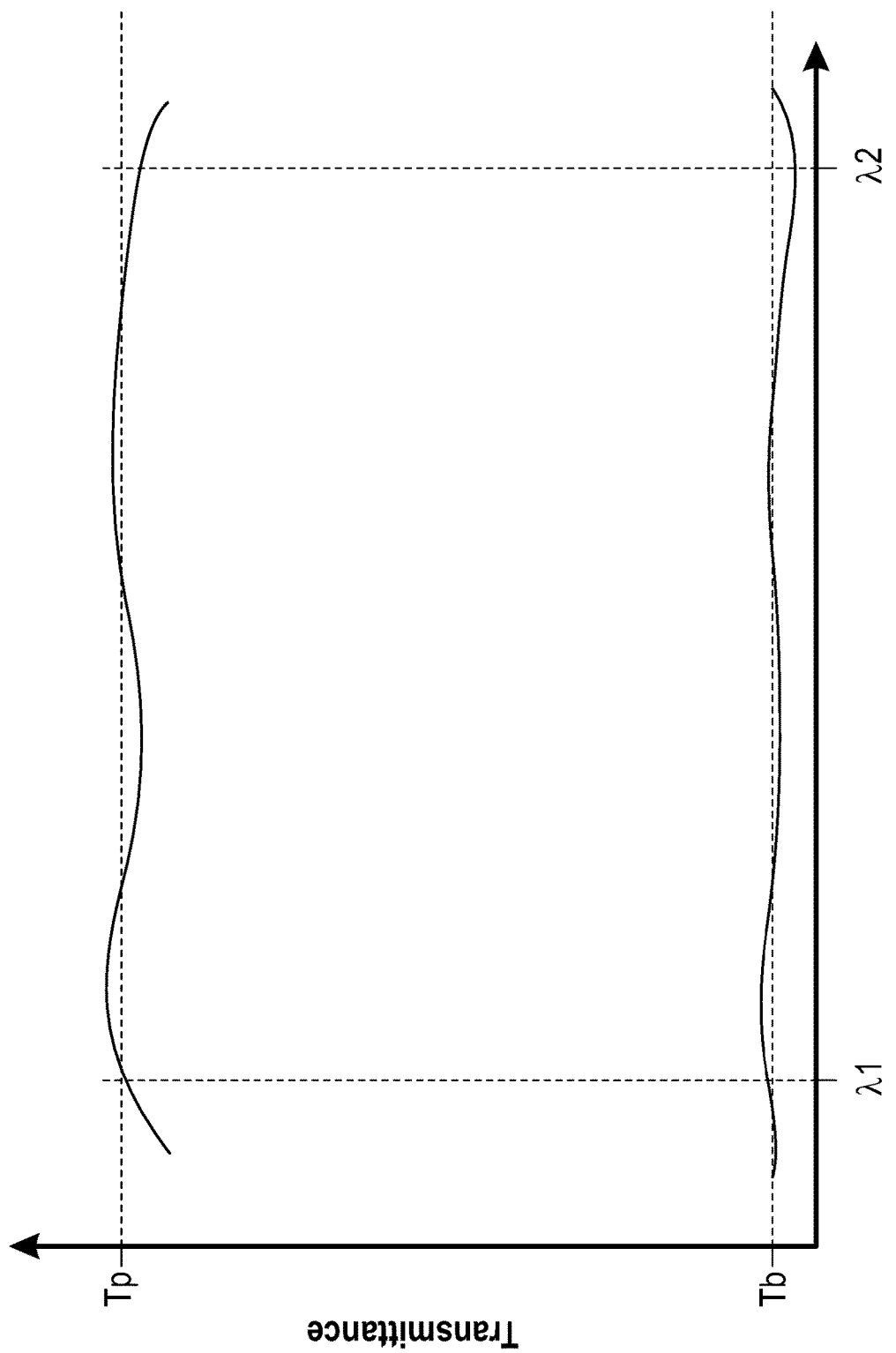
FIG. 17 is a schematic plot of the transmittance of a reflective polarizer.

FIG. 17 is a schematic plot of the transmittance of a reflective polarizer for the pass and block states of the reflective polarizer for light normally incident on the reflective polarizer from one side of the reflective polarizer. The transmittance may be substantially the same for light normally incident on the reflective polarizer from the other side of the reflective polarizer. The average of the transmittance over wavelengths in the predetermined wavelength range from $\lambda 1$ to $\lambda 2$ is Tp in the pass state and Tb in the block is state. In some embodiments, $\lambda 1$ is about 400 nm and $\lambda 2$ is about 700 nm. In some embodiments Tp is at greater than about 80%, or greater than about 85%, or greater than 90%. In some embodiments, Tb is no more than about 10%, or no more than about 5%, or no more than about 2%, or no more than about 1%, or no more than about 0.5%. In some embodiments, Tp and Tb for light incident on one side of the reflective polarizer satisfies at least one of these conditions, and in some embodiments, Tp and Tb for light incident on each side of the reflective polarizer satisfies at least one of these conditions.

Figure 18:
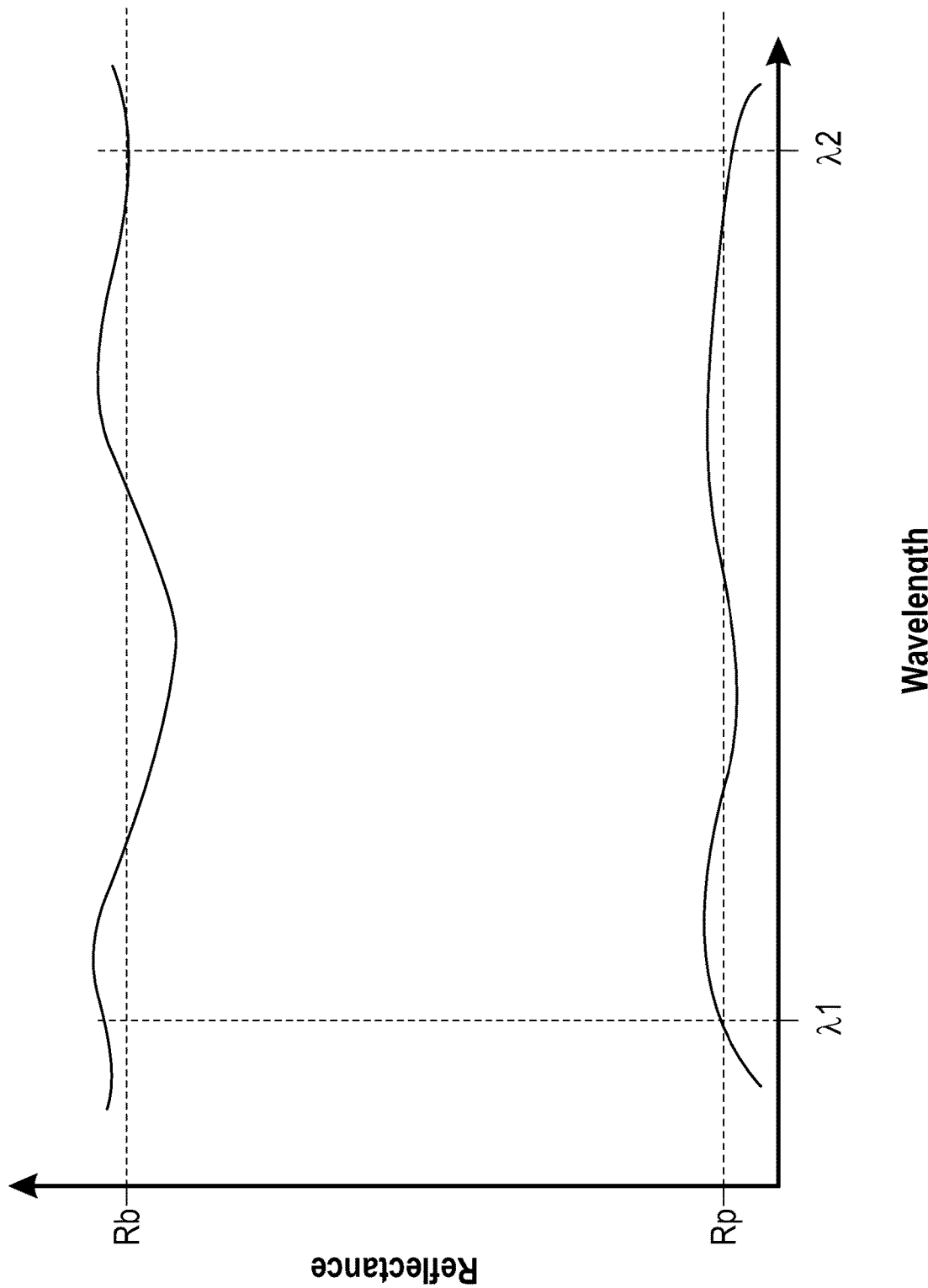
FIG. 18 is a schematic plot of the reflectance of a reflective polarizer.

FIG. 18 is a schematic plot of the reflectance of a reflective polarizer for the pass and block states of the reflective polarizer for light normally incident on the reflective polarizer from one side of the reflective polarizer. The reflectance may be substantially the same for light normally incident on the reflective polarizer from the other side of the reflective polarizer or may be different due to the presence of dichroic dyes, for example. The average of the reflectance over wavelengths in the predetermined wavelength range from $\lambda 1$ to $\lambda 2$ is Rp in the pass state and Rb in the block is state. In some embodiments Rb is greater than about 75%, or greater than about 80%, or greater than about 85%, or greater than about 90%. In some embodiments, Rp is no more than about 20%, or no more than about 15%, or no more than about 10%, or no more than about 5%. In some embodiments, Rp and Rb for light incident on one side of the reflective polarizer satisfies at least one of these conditions, and in some embodiments, Rp and Rb for light incident on each side of the reflective polarizer satisfies at least one of these conditions.

Figure 19:
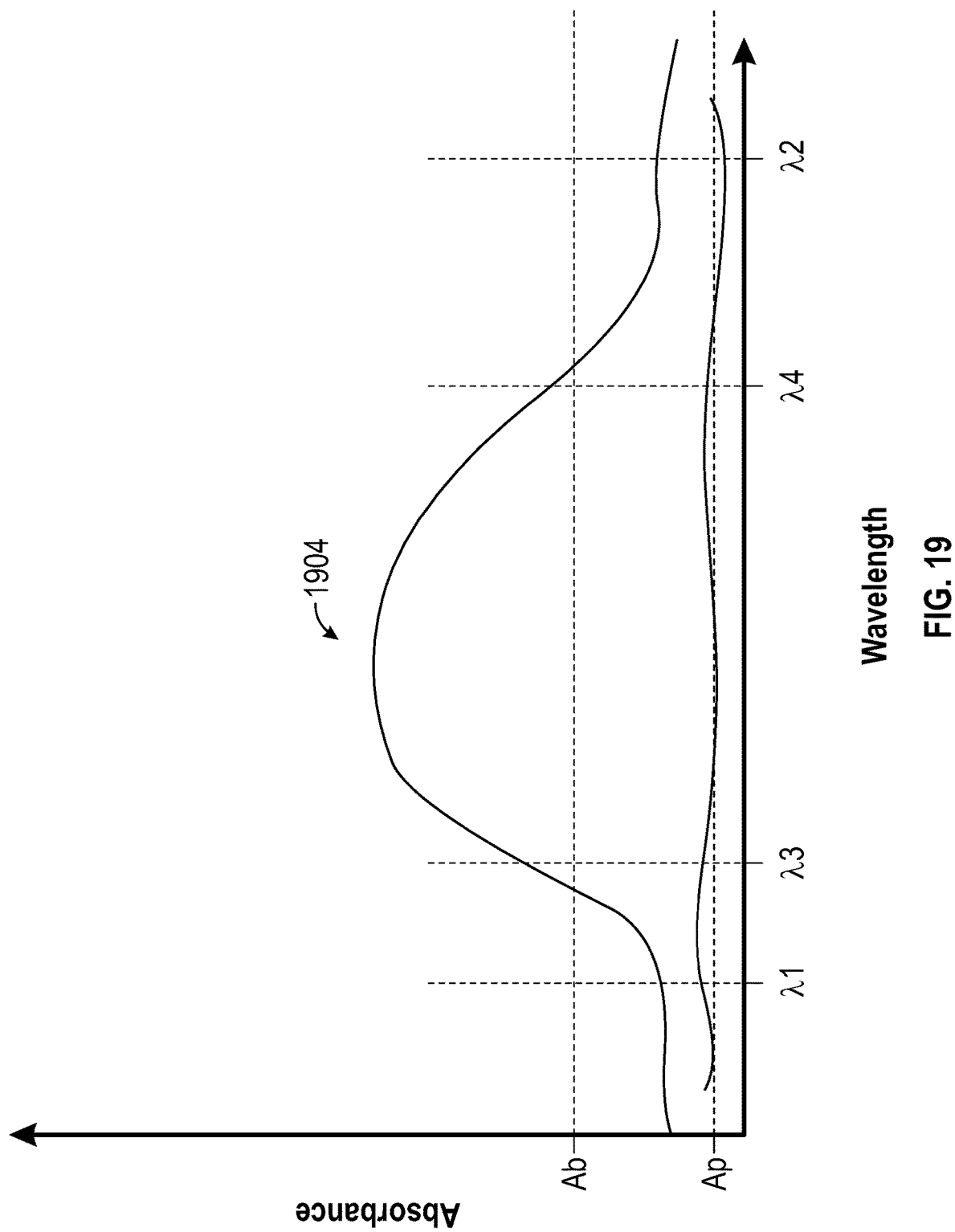
FIG. 19 is a schematic plot of the absorbance of a reflective polarizer.

FIG. 19 is a schematic plot of the absorbance of a reflective polarizer, which incorporates a plurality of light absorbing molecules, for the pass and block states of the reflective polarizer for light normally incident on the reflective polarizer from one side of the reflective polarizer. The absorbance may be different for light normally incident on the reflective polarizer from the other side of the reflective polarizer due to the presence of light absorbing dyes. The average of the absorbance over wavelengths in the predetermined wavelength range from $\lambda 1$ to $\lambda 2$ is Ap in the pass state and Ab in the block is state. In some embodiments, Ap is no more than about 3%, or no more than about 2%, or no more than about 1%. In some embodiments, Ab is greater than about 2%, or greater than about 5%, or greater than about 10%. In some embodiments, Ap and Ab for light incident on one side of the reflective polarizer satisfies at least one of these conditions, and in some embodiments, Ap and Ab for light incident on each side of the reflective polarizer satisfies at least one of these conditions. In some embodiments, the plurality of light absorbing molecules have an absorption band 1904 from $\lambda 3$ to $\lambda 4$. In some embodiments, the wavelength range from $\lambda 3$ to $\lambda 4$ is at least partially within the predetermined wavelength range from $\lambda 1$ to $\lambda 2$. In some embodiments, the wavelength range from $\lambda 3$ to $\lambda 4$ in entirely within the predetermined wavelength range from $\lambda 1$ to $\lambda 2$ and in some embodiments the wavelength range from $\lambda 3$ to $\lambda 4$ extends to wavelengths lower than $\lambda 1$ and/or extends to wavelengths larger than $\lambda 2$.

In some embodiments, an optical film has a greater average optical reflectance for light incident from a first major side of the optical film and a smaller average optical reflectance for light incident from an opposite second major side of the optical film. In some embodiments, an optical system for displaying an image emitted by a display to a viewing position is provided. The optical system includes the optical film, where the first major side of the optical film faces the display and the second major side of the optical film faces the viewing position. For example, referring to FIG. 2, layer 226 may be a reflective polarizer having a greater average optical reflectance for light incident from a first major side of the optical film (side facing the display 250) and a smaller average optical reflectance for light incident from an opposite second major side of the optical film (side facing layer 222). This can occur when dichrioic dyes are included in some layers of the optical film, as described further elsewhere herein.

In some embodiments, the reflective polarizer or an optical stack including the reflective polarizer is formed into a curved shape. In some embodiments, the shaped reflective polarizer or shaped optical stack is bonded to a curved surface of an optical element using an optical adhesive. In other embodiments, an optical element is formed directly onto the shaped reflective polarizer or shaped optical stack via insert molding as generally described in U.S. Pat. Appl. Pub. No. 2017/0068100 (Ouderkirk et al.), for example.

The reflective polarizer or optical stack can be shaped via thermoforming, for example, as generally described in U.S. Pat. Appl. Pub. No. 2017/0068100 (Ouderkirk et al.). Suitable thermoforming systems include the vacuum forming systems available from MAAC Machinery Corporation (Carol Stream, IL) and the pressurization forming systems available from Hy-Tech Forming Systems (USA), Inc. (Phoenix, AZ).

Terms such as "about" will be understood in the context in which they are used and described in the present description by one of ordinary skill in the art. If the use of "about" as applied to quantities expressing feature sizes, amounts, and physical properties is not otherwise clear to one of ordinary skill in the art in the context in which it is used and described in the present description, "about" will be understood to mean within 10 percent of the specified value. A quantity given as about a specified value can be precisely the specified value. For example, if it is not otherwise clear to one of ordinary skill in the art in the context in which it is used and described in the present description, a quantity having a value of about 1, means that the quantity has a value between 0.9 and 1.1, and that the value could be 1.

Terms such as "substantially" will be understood in the context in which they are used and described in the present description by one of ordinary skill in the art. If the use of "substantially parallel" is not otherwise clear to one of ordinary skill in the art in the context in which it is used and described in the present description, "substantially parallel" will mean within 30 degrees of parallel. Directions or surfaces described as substantially parallel to one another may, in some embodiments, be within 20 degrees, or within 10 degrees of parallel, or may be parallel or nominally parallel. If the use of "substantially normal" is not otherwise clear to one of ordinary skill in the art in the context in which it is used and described in the present description, "substantially normal" will mean within 30 degrees of normal. Directions described as substantially normal may, in some embodiments, be within 20 degrees, or within 10 degrees of normal, or may be normal or nominally normal.

The following is a list of exemplary embodiments of the present description.

Embodiment 1 is an optical system, comprising:
a first optical element comprising a curved first major surface; and
an optical stack bonded and conforming to the curved first major surface of the first optical element and comprising:
   a reflective polarizer substantially transmitting light having a first polarization state and substantially reflecting light having an orthogonal second polarization state; and
   a non-adhesive flexible optical layer bonded to the reflective polarizer and comprising substantially parallel opposing first and second major surfaces, at least one location on the non-adhesive flexible optical layer having an optical retardance of less than about 100 nm or greater than about 200 nm at a wavelength of about 550 nm.

Embodiment 2 is the optical system of Embodiment 1, wherein the first optical element further comprises a second major surface, the first and second major surfaces of the first optical element forming an angle therebetween in a range from about 20 degrees to about 120 degrees.

Embodiment 3 is the optical system of Embodiment 1, wherein the first optical element comprises a first optical lens having an optical power in two mutually orthogonal directions.

Embodiment 4 is the optical system of Embodiment 1, wherein the first optical element comprises a first optical prism.

Embodiment 5 is the optical system of Embodiment 1 further comprising a second optical element adjacent the first optical element and comprising substantially non-parallel first and second major surfaces.

Embodiment 6 is the optical system of Embodiment 1, wherein the reflective polarizer comprises N sequentially numbered layers, N an integer greater than 200 and less than 800, each layer having an average thickness less than about 200 nm, a fitted curve being a best-fit regression applied to a layer thickness of the reflective polarizer as a function of layer number, an average slope of the fitted curve in a region extending from the first layer to the Nth layer being less than about 0.2 nm.

Embodiment 7 is the optical system of Embodiment 1, wherein the optical retardance is less than about 80 nm, or less than about 60 nm, or less than about 40 nm, or less than about 30 nm, or less than about 20 nm, or less than about 10 nm, or less than about 5 nm.

Embodiment 8 is the optical system of Embodiment 1, wherein the optical retardance is greater than about 400 nm, or greater than about 800 nm, or greater than about 1000 nm, or greater than about 2000 nm, or greater than about 3000 nm, or greater than about 4000 nm.

Embodiment 9 is the optical system of Embodiment 1, wherein the non-adhesive flexible optical layer comprises one or more of a polymeric film, an anti-reflective coating, an absorbing polarizer, a neutral-density filter, a retarder, a dyed film, an optical filter, a film containing electrical circuits, electrodes, infrared reflecting film, a multilayer optical film, and a diffuser.

Embodiment 10 is the optical system of Embodiment 1, wherein the non-adhesive flexible optical layer is a release liner.

Embodiment 11 is the optical system of Embodiment 1, wherein the reflective polarizer is a polymeric multilayer optical film comprising:
   a plurality of interference layers, each interference layer reflecting or transmitting light primarily by optical interference, an average total thickness of the plurality of interference layers from about 20 micrometers to about 70 micrometers; and
   at least one noninterference layer integrally formed with the plurality of interference layers and not reflecting or transmitting light primarily by optical interference, an average total thickness of the at least one noninterference layer from about 40 micrometers to about 100 micrometers, such that for substantially normally incident light in a predetermined wavelength range, the plurality of interference layers has an average optical transmittance greater than about 85% for the first polarization state, and an average optical reflectance greater than about 80% for the second polarization state.

Embodiment 12 is a polarizing beam splitter (PBS) comprising:
a first prism comprising a first hypotenuse;
a second prism comprising a second hypotenuse facing the first hypotenuse; and
an optical stack disposed between and adhered to the first and second hypotenuses, the optical stack comprising:
   a reflective polarizer substantially transmitting light having a first polarization state and substantially reflecting light having an orthogonal second polarization state;
   a non-adhesive flexible optical layer bonded to the reflective polarizer and comprising substantially parallel opposing first and second major surfaces, at least one location on the non-adhesive flexible optical layer having an optical retardance less than about 100 nm or greater than about 200 nm; and
   an adhesive layer disposed between and bonding the reflective polarizer to the non-adhesive flexible optical layer.

Embodiment 13 is the PBS of Embodiment 12, wherein at least one of the first and second hypotenuses is curved.

Embodiment 14 is the PBS of Embodiment 12, wherein the reflective polarizer comprises a plurality of interference layers, each interference layer reflecting or transmitting light primarily by optical interference.

Embodiment 15 is the PBS of Embodiment 12, wherein the reflective polarizer comprises N sequentially numbered layers, N an integer greater than 200 and less than 800, each layer having an average thickness less than about 200 nm, a fitted curve being a best-fit regression applied to a layer thickness of the reflective polarizer as a function of layer number, an average slope of the fitted curve in a region extending from the first layer to the Nth layer being less than about 0.2 nm.

Embodiment 16 is the PBS of Embodiment 12, wherein the reflective polarizer is a polymeric multilayer optical film comprising:
  a plurality of interference layers, each interference layer reflecting or transmitting light primarily by optical interference, an average total thickness of the plurality of interference layers from about 20 micrometers to about 70 micrometers; and
  at least one noninterference layer integrally formed with the plurality of interference layers and not reflecting or transmitting light primarily by optical interference, an average total thickness of the at least one noninterference layer from about 40 micrometers to about 100 micrometers, such that for substantially normally incident light in a predetermined wavelength range, the plurality of interference layers has an average optical transmittance greater than about 85% for the first polarization state, and an average optical reflectance greater than about 80% for the second polarization state.

Embodiment 17 is a lens assembly, comprising:
a first optical lens comprising an optical power in at least one direction; and
an optical stack adhered to the first optical lens and comprising:
  a reflective polarizer substantially transmitting light having a first polarization state and substantially reflecting light having an orthogonal second polarization state;
  a non-adhesive flexible optical layer bonded to the reflective polarizer and comprising substantially parallel opposing first and second major surfaces, at least one location on the non-adhesive flexible optical layer having an optical retardance less than about 100 nm or greater than about 200 nm; and
  an adhesive layer disposed between and bonding the reflective polarizer to the non-adhesive flexible optical layer.

Embodiment 18 is the lens assembly of Embodiment 17, wherein the non-adhesive flexible optical layer comprises one or more of a polymeric film, an anti-reflective coating, an absorbing polarizer, a neutral-density filter, a retarder, a dyed film, an optical filter, a film containing electrical circuits, electrodes, infrared reflecting film, a multilayer optical film, and a diffuser.

Embodiment 19 is the lens assembly of Embodiment 17, wherein the non-adhesive flexible optical layer is a release liner.

Embodiment 20 is the lens assembly of Embodiment 17, wherein the reflective polarizer is a polymeric multilayer optical film comprising:
  a plurality of interference layers, each interference layer reflecting or transmitting light primarily by optical interference, an average total thickness of the plurality of interference layers from about 20 micrometers to about 70 micrometers; and
  at least one noninterference layer integrally formed with the plurality of interference layers and not reflecting or transmitting light primarily by optical interference, an average total thickness of the at least one noninterference layer from about 40 micrometers to about 100 micrometers, such that for substantially normally incident light in a predetermined wavelength range, the plurality of interference layers has an average optical transmittance greater than about 85% for the first polarization state, and an average optical reflectance greater than about 80% for the second polarization state.

Embodiment 21 is the lens assembly of Embodiment 17, wherein the reflective polarizer comprises a plurality of interference layers, each interference layer reflecting or transmitting light primarily by optical interference, such that for substantially normally incident light in a predetermined wavelength range, the plurality of interference layers has an average optical transmittance greater than about 85% for the first polarization state, an average optical reflectance greater than about 80% for the second polarization state, and an average optical absorption of greater than about 2% for the second polarization state, such that for substantially normally incident light in the predetermined wavelength range, the optical film has a greater average optical reflectance for light incident from a first major side of the reflective polarizer and a smaller average optical reflectance for light incident from an opposite second major side of the reflective polarizer.

Embodiment 22 is a lens assembly comprising:
a first optical lens comprising an optical power in at least one direction and a curved first major surface; and
an integrally formed reflective polarizer comprising a plurality of interference layers, each interference layer reflecting or transmitting light primarily by optical interference, at least one interference layer being substantially uniaxially oriented at at least one location, the reflective polarizer adhered to the first major surface of the first optical lens, the reflective polarizer substantially transmitting light having a first polarization state and substantially reflecting light having an orthogonal second polarization state,
wherein the first major surface comprises an active region having a maximum projected dimension D and a corresponding maximum sag S, S/D≥0.03; and
an average thickness of the reflective polarizer is greater than about 50 micrometers.

Embodiment 23 is the lens assembly of Embodiment 22, wherein the reflective polarizer further comprises at least one noninterference layer integrally formed with the plurality of interference layers and not reflecting or transmitting light primarily by optical interference, an average total thickness of the at least one noninterference layer being from about 40 micrometers to about 100 micrometers, an average total thickness of the plurality of interference layers being from about 20 micrometers to about 70 micrometers.

Embodiment 24 is an optical film comprising:
  a plurality of interference layers, each interference layer reflecting or transmitting light primarily by optical interference, an average total thickness of the plurality of interference layers from about 20 micrometers to about 70 micrometers; and
  at least one noninterference layer integrally formed with the plurality of interference layers and not reflecting or transmitting light primarily by optical interference, an average total thickness of the at least one noninterference layer from about 40 micrometers to about 100 micrometers, such that for substantially normally incident light in a predetermined wavelength range, the plurality of interference layers has an average optical transmittance greater than about 85% for a first polarization state, and an average optical reflectance greater than about 80% for an orthogonal second polarization state.

Embodiment 25 is the optical film of Embodiment 24, wherein the at least one noninterference layer comprises a non-adhesive flexible optical layer comprising substantially parallel opposing first and second major surfaces, at least one location on the non-adhesive flexible optical layer having an optical retardance less than about 100 nm or greater than about 200 nm.

Embodiment 26 is the optical film of Embodiment 24 having an average optical absorption of greater than about 2% for substantially normally incident light in a predetermined wavelength range having the second polarization state, such that for substantially normally incident light in the predetermined wavelength range, the optical film has a greater average optical reflectance for light incident from a first major side of the optical film and a smaller average optical reflectance for light incident from an opposite second major side of the optical film.

Embodiment 27 is a reflective polarizer assembly, comprising:

an integrally formed reflective polarizer having an average thickness of greater than about 50 micrometers and comprising a plurality of interference layers, each interference layer reflecting or transmitting light primarily by optical interference, at least one interference layer being substantially uniaxially oriented at at least one location, the integrally formed reflective polarizer comprising an outermost curved major surface; and an optical element formed directly on and conforming to the outermost curved major surface of the reflective polarizer.

Embodiment 28 is the reflective polarizer assembly of Embodiment 27, wherein the integrally formed reflective polarizer further comprises at least one noninterference layer integrally formed with the plurality of interference layers and not reflecting or transmitting light primarily by optical interference, an average total thickness of the at least one noninterference layer being from about 40 micrometers to about 100 micrometers, an average total thickness of the plurality of interference layers being from about 20 micrometers to about 70 micrometers.

Embodiment 29 is the reflective polarizer assembly of Embodiment 27, wherein for substantially normally incident light in a predetermined wavelength range, the plurality of interference layers has an average optical transmittance greater than about 85% for a first polarization state, an average optical reflectance greater than about 80% for an orthogonal second polarization state, and an average optical absorption of greater than about 2% for the second polarization state, such that for substantially normally incident light in the predetermined wavelength range, the integrally formed reflective polarizer has a greater average optical reflectance for light incident from a first major side of the reflective polarizer and a smaller average optical reflectance for light incident from an opposite second major side of the reflective polarizer.

Embodiment 30 is a lens assembly, comprising:

a first optical lens having an optical power in at least one direction and a curved major first surface having an undesired characteristic;

an integrally formed reflective polarizer comprising a plurality of interference layers, each interference layer reflecting or transmitting light primarily by optical interference, the integrally formed reflective polarizer comprising opposing major first and second outermost surfaces; and an adhesive layer bonding the major first surface of the integrally formed reflective polarizer to the major first surface of the first optical lens, the bonding compensating for the undesired uncharacteristic of the first major surface of the first optical lens, the second outermost surface of the integrally formed reflective polarizer having a desired characteristic.

Embodiment 31 is the lens assembly of Embodiment 30, wherein the undesired characteristic comprises surface curvature, the curved major first surface of the first optical lens having an undesired curvature, the second outermost surface of the integrally formed reflective polarizer having a desired curvature.

Embodiment 32 is the lens assembly of Embodiment 30, wherein the undesired characteristic comprises average surface roughness, the curved major first surface having an undesired average surface roughness, the second outermost surface of the integrally formed reflective polarizer having a desired average surface roughness.

Embodiment 33 is the lens assembly of Embodiment 32, wherein the second outermost surface, but not the curved major first surface, is optically smooth.

Embodiment 34 is an optical system comprising:

at least one lens having an optical power greater than zero in at least one direction;

a partial reflector having an average optical reflectance of at least 30% for substantially normally incident light in a predetermined wavelength range; and a reflective polarizer substantially transmitting light having a first polarization state in the predetermined wavelength range and substantially reflecting light having an orthogonal second polarization state in the predetermined wavelength range, the optical system having an optical axis, a light ray propagating along the optical axis passing through the at least one lens, the partial reflector and the reflective polarizer without being substantially refracted, such that for an incident cone of light having the second polarization state and a wavelength in the predetermined wavelength range and centered on the optical axis with a full cone angle from about 100 degrees to about 160 degrees, the incident light exits the optical system having a first light component having the first polarization state and a second light component having the second polarization state, a ratio of an average intensity of the first light component to an average intensity of the second light component greater than about 100.

Embodiment 35 is the optical system of Embodiment 34, wherein an optical stack comprises the reflective polarizer and a non-adhesive flexible optical layer bonded to the reflective polarizer.

Embodiment 36 is the optical system of Embodiment 35, wherein the at least one lens includes a first lens, the first lens comprising a curved first major surface, the optical stack bonded and conforming to the curved first major surface.

Embodiment 37 is the optical system of Embodiment 34, wherein the reflective polarizer is a polymeric multilayer optical film comprising:

a plurality of interference layers, each interference layer reflecting or transmitting light primarily by optical interference, an average total thickness of the plurality of interference layers from about 20 micrometers to about 70 micrometers; and at least one noninterference layer integrally formed with the plurality of interference layers and not reflecting or transmitting light primarily by optical interference, an average total thickness of the at least one noninterference layer from about 40 micrometers to about 100 micrometers, such that for substantially normally incident light in a predetermined wavelength range, the plurality of interference layers has an average optical transmittance greater than about 85% for the first polarization state, and an average optical reflectance greater than about 80% for the second polarization state.

Embodiment 38 is the optical system of Embodiment 34, wherein the reflective polarizer is integrally formed and comprises a plurality of interference layers, each interference layer reflecting or transmitting light primarily by optical interference, the reflective polarizer adhered to the curved first major surface, the curved first major surface comprising an active region having a maximum projected dimension D and a corresponding maximum sag S, S/D≥0.03.

Embodiment 39 is the optical system of Embodiment 34, wherein an average thickness of the reflective polarizer is greater than about 50 micrometers.

EXAMPLES

Reflective Polarizer 1

A birefringent reflective polarizer optical film was prepared as follows. Two multilayer optical packets were co-extruded with each packet comprised of 325 alternating layers of polyethylene naphthalate (PEN) and a low index isotropic layer, which was made with a blend of polycarbonate and copolyesters (PC:coPET) such that the index is about 1.57 and remains substantially isotropic upon uniaxial orientation, wherein the PC:coPET molar ratio is approximately 42.5 mol % PC and 57.5 mol % coPET and has a Tg of 105 degrees centigrade. This isotropic material was chosen such that after stretching its refractive indices in the two non-stretch directions remains substantially matched with those of the birefringent material in the non-stretching direction while in the stretching direction there is a substantial mis-match in refractive indices between birefringent and non-birefringent layers. The PEN and PC/coPET polymers were fed from separate extruders to a multilayer coextrusion feedblock, in which they were assembled into packets of 325 alternating optical layers ("Packet 1" and "Packet 2" respectively), plus a thicker protective boundary layer of the PC/coPET, on the outside of the stacked optical packets, for a total of 652 layers. The film was substantially uniaxially stretched in a parabolic tenter as described in U.S. Pat. No. 6,916,440 (Jackson et al.). The film was stretched at a temperature of about 150° C. to a draw ratio of about 6.

This layer thickness profile for Reflective Polarizer 1 is shown in FIG. 14B with Packets 1 and 2 indicated. The average slope of Packet 1 was about approximately 0.17 nm/layer and the average slope of Packet 2 was approximately 0.18 nm/layer using a least squares linear regression, exhibiting a difference in the respective slopes for the two packets of approximately 6%. The Reflective Polarizer 1 had a resulting total thickness as measured by a capacitance gauge of approximately 63.2 μm, a transmittance in the pass state of 90% and a transmittance in the block state of 0.015%. The total thickness of interference layers was 54.2 micrometers, the noninterference layers included outermost layers (e.g., corresponding to noninterference layers 1377a and 1377c) having a thickness of 2.2 micrometers and 3.5 micrometers, respectively, and an inner spacer layer (e.g., corresponding to noninterference layer 1377b) having a thickness of 3.3 micrometers.

Example 1

Reflective Polarizer 1 was laminated to a 75 micrometer thick polymethylmethacrylate (PMMA) films using 1 mil thick 3M 8171 optically clear adhesive (available from 3M Company, St. Paul, MN). The resulting laminate was thermoformed into a curved shape having a sag to diameter ratio of 0.026 using a vacuum forming process. A lens was formed onto the laminate by injection molding optical grade acrylic onto the laminate in an insert molding process. The thermoforming and injection molding were carried out as described in U.S. Pat. Appl. Pub. No. 2017/0068100 (Ouderkirk et al.). No wrinkling of the laminate was observed during the forming process.

Example 2

Reflective Polarizer 1 was laminated to a 75 micrometer thick polymethylmethacrylate (PMMA) films using 1 mil thick 3M 8171 optically clear adhesive (available from 3M Company, St. Paul, MN). The resulting laminate was thermoformed into a curved shape having a sag to diameter ratio of 0.13 using a vacuum forming process. A lens was formed onto the laminate by injection molding optical grade acrylic onto the laminate in an insert molding process. The thermoforming and injection molding were carried out as described in U.S. Pat. Appl. Pub. No. 2017/0068100 (Ouderkirk et al.). No wrinkling of the laminate was observed during the forming process.

Example 3

Reflective Polarizer 1 was laminated between two 75 micrometer thick polymethylmethacrylate (PMMA) films using 1 mil thick 3M 8171 optically clear adhesive (available from 3M Company, St. Paul, MN). The resulting laminate was thermoformed into a curved shape having a sag to diameter ratio of 0.026 using a vacuum forming process. The laminate of Example 3 held its desired shape to a better tolerance compared to the laminate of Example 1. A lens was formed onto the laminate by injection molding optical grade acrylic onto the laminate in an insert molding process. The thermoforming and injection molding were carried out as described in U.S. Pat. Appl. Pub. No. 2017/0068100 (Ouderkirk et al.). No wrinkling of the laminate was observed during the forming process.

Example 4

Reflective Polarizer 1 was laminated between two 75 micrometer thick polymethylmethacrylate (PMMA) films using 1 mil thick 3M 8171 optically clear adhesive (available from 3M Company, St. Paul, MN). The resulting laminate was thermoformed into a curved shape having a sag to diameter ratio of 0.13 using a vacuum forming process. The laminate of Example 4 held its desired shape to a better tolerance compared to the laminate of Example 2. A lens was formed onto the laminate by injection molding optical grade acrylic onto the laminate in an insert molding process. The thermoforming and injection molding were carried out as described in U.S. Pat. Appl. Pub. No. 2017/0068100 (Ouderkirk et al.). No wrinkling of the laminate was observed during the forming process.

Descriptions for elements in figures should be understood to apply equally to corresponding elements in other figures, unless indicated otherwise. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. An optical system, comprising:
a first optical element comprising a curved first major surface; and
an optical stack formed into a curved shape, the optical stack bonded and conforming to the curved first major surface of the first optical element and comprising:
a reflective polarizer substantially transmitting light having a first polarization state and substantially reflecting light having an orthogonal second polarization state; and
a non-adhesive flexible optical layer bonded to the reflective polarizer prior to forming the optical stack into the curved shape, such that the non-adhesive flexible optical layer improves a desired optical property of the reflective polarizer upon forming the optical stack into the curved shape relative to that of the reflective polarizer being formed into the curved shape without the non-adhesive flexible optical layer, the non-adhesive flexible optical layer comprising substantially parallel opposing first and second major surfaces, at least one location on the non-adhesive flexible optical layer having an optical retardance of greater than about 200 nm at a wavelength of about 550 nm,
wherein the reflective polarizer comprises a plurality of interference layers, each interference layer reflecting or transmitting light primarily by optical interference, such that for substantially normally incident light in a predetermined wavelength range of from 400 nm to 700 nm, the plurality of interference layers comprising dichroic dye such that the plurality of interference layers has an average optical absorption of greater than about 2% for the second polarization state.

2. The optical system of claim 1, wherein the first optical element further comprises a second major surface, the first and second major surfaces of the first optical element forming an angle therebetween in a range from about 20 degrees to about 120 degrees.

3. The optical system of claim 1, wherein the first optical element comprises a first optical lens having an optical power in two mutually orthogonal directions.

4. The optical system of claim 1, wherein the first optical element comprises a first optical prism.

5. The optical system of claim 1 further comprising a second optical element adjacent the first optical element and comprising substantially non-parallel first and second major surfaces.

6. The optical system of claim 1, wherein the reflective polarizer comprises N sequentially numbered layers, N being an integer greater than 200 and less than 800, each layer having an average thickness less than about 200 nm, a fitted curve being a best-fit regression applied to a layer thickness of the reflective polarizer as a function of layer number, an average slope of the fitted curve in a region extending from the first layer to the Nth layer being less than about 0.2 nm.

7. The optical system of claim 1, wherein the optical retardance is greater than about 400 nm.

8. The optical system of claim 1, wherein the optical retardance is greater than about 800 nm.

9. The optical system of claim 1, wherein:
an average total thickness of the plurality of interference layers is from about 20 micrometers to about 70 micrometers; and
the reflective polarizer is a polymeric multilayer optical film comprising at least one noninterference layer integrally formed with the plurality of interference layers and not reflecting or transmitting light primarily by optical interference, an average total thickness of the at least one noninterference layer being from about 40 micrometers to about 100 micrometers, such that for substantially normally incident light in the predetermined wavelength range, the plurality of interference layers has an average optical transmittance greater than about 85% for the first polarization state, and an average optical reflectance greater than about 80% for the second polarization state.

10. A polarizing beam splitter (PBS) comprising:
a first prism comprising a first hypotenuse;
a second prism comprising a second hypotenuse facing the first hypotenuse, at least one of the first and second hypotenuses being curved; and
an optical stack formed into a curved shape, the optical stack disposed between and adhered to the first and second hypotenuses, the optical stack comprising:
a reflective polarizer substantially transmitting light having a first polarization state and substantially reflecting light having an orthogonal second polarization state;
a non-adhesive flexible optical layer bonded to the reflective polarizer prior to forming the optical stack into the curved shape, such that the non-adhesive flexible optical layer improves a desired optical property of the reflective polarizer upon forming the optical stack into the curved shape relative to that of the reflective polarizer being formed into the curved shape without the non-adhesive flexible optical layer, the non-adhesive flexible optical layer comprising substantially parallel opposing first and second major surfaces, at least one location on the non-adhesive flexible optical layer having an optical retardance greater than about 200 nm; and
an adhesive layer disposed between and bonding the reflective polarizer to the non-adhesive flexible optical layer,
wherein the reflective polarizer comprises a plurality of interference layers, each interference layer reflecting or transmitting light primarily by optical interference, such that for substantially normally incident light in a predetermined wavelength range of from 400 nm to 700 nm, the plurality of interference layers comprising dichroic dye such that the plurality of interference layers has an average optical absorption of greater than about 2% for the second polarization state.

11. The PBS of claim 10, wherein the reflective polarizer comprises N sequentially numbered layers, N being an integer greater than 200 and less than 800, each layer having an average thickness less than about 200 nm, a fitted curve being a best-fit regression applied to a layer thickness of the reflective polarizer as a function of layer number, an average slope of the fitted curve in a region extending from the first layer to the Nth layer being less than about 0.2 nm.

12. The PBS of claim 10, wherein:
an average total thickness of the plurality of interference layers is from about 20 micrometers to about 70 micrometers; and
the reflective polarizer is a polymeric multilayer optical film comprising at least one noninterference layer integrally formed with the plurality of interference layers and not reflecting or transmitting light primarily by optical interference, an average total thickness of the at least one noninterference layer being from about 40 micrometers to about 100 micrometers, such that for substantially normally incident light in the predetermined wavelength range, the plurality of interference layers has an average optical transmittance greater than about 85% for the first polarization state, and an average optical reflectance greater than about 80% for the second polarization state.

13. The PBS of claim 10, wherein the optical retardance is greater than about 400 nm.

14. A lens assembly, comprising:
a first optical lens comprising optical power in at least one direction; and
an optical stack formed into a curved shape, the optical stack adhered to the first optical lens and comprising:
a reflective polarizer substantially transmitting light having a first polarization state and substantially reflecting light having an orthogonal second polarization state;
a non-adhesive flexible optical layer bonded to the reflective polarizer prior to forming the optical stack into the curved shape, such that the non-adhesive flexible optical layer improves a desired optical property of the reflective polarizer upon forming the optical stack into the curved shape relative to that of the reflective polarizer being formed into the curved shape without the non-adhesive flexible optical layer, the non-adhesive flexible optical layer comprising substantially parallel opposing first and second major surfaces, at least one location on the non-adhesive flexible optical layer having an optical retardance greater than about 200 nm; and
an adhesive layer disposed between and bonding the reflective polarizer to the non-adhesive flexible optical layer,
wherein the reflective polarizer comprises a plurality of interference layers, each interference layer reflecting or transmitting light primarily by optical interference, such that for substantially normally incident light in a predetermined wavelength range of from 400 nm to 700 nm, the plurality of interference layers comprising dichroic dye such that the plurality of interference layers has an average optical absorption of greater than about 2% for the second polarization state.

15. The lens assembly of claim 14, wherein the first optical lens comprises optical power in two mutually orthogonal directions.

16. The lens assembly of claim 14, wherein the optical retardance is greater than about 400 nm.

17. The lens assembly of claim 14, wherein:
an average total thickness of the plurality of interference layers is from about 20 micrometers to about 70 micrometers; and
the reflective polarizer is a polymeric multilayer optical film comprising at least one noninterference layer integrally formed with the plurality of interference layers and not reflecting or transmitting light primarily by optical interference, an average total thickness of the at least one noninterference layer being from about 40 micrometers to about 100 micrometers, such that for substantially normally incident light in the predetermined wavelength range, the plurality of interference layers has an average optical transmittance greater than about 85% for the first polarization state, and an average optical reflectance greater than about 80% for the second polarization state.

18. The lens assembly of claim 14, wherein for substantially normally incident light in the predetermined wavelength range, the plurality of interference layers has an average optical transmittance greater than about 85% for the first polarization state, an average optical reflectance greater than about 80% for the second polarization state, and an average optical absorption of greater than about 5% for the second polarization state, such that for substantially normally incident light in the predetermined wavelength range, the reflective polarizer has a greater average optical reflectance for light incident from a first major side of the reflective polarizer and a smaller average optical reflectance for light incident from an opposite second major side of the reflective polarizer.

* * * * *